US006977665B2

(12) United States Patent
Yokouchi

(10) Patent No.: US 6,977,665 B2
(45) Date of Patent: Dec. 20, 2005

(54) METHOD, APPARATUS AND RECORDING MEDIUM FOR GENERATING COMPOSITE IMAGE

(75) Inventor: Kouji Yokouchi, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 630 days.

(21) Appl. No.: 09/725,102

(22) Filed: Nov. 29, 2000

(65) Prior Publication Data

US 2001/0004258 A1  Jun. 21, 2001

(30) Foreign Application Priority Data

Nov. 29, 1999  (JP) .................................. 11-337994
Nov. 29, 1999  (JP) .................................. 11-337995

(51) Int. Cl.[7] .......................... G06K 9/62; G09G 5/00; G06F 15/00
(52) U.S. Cl. ...................... 345/629; 345/619; 345/630; 345/654; 715/908; 715/517; 715/520; 715/530; 382/209; 358/1.18
(58) Field of Search ............................... 345/418, 866, 345/594, 804, 619–621, 629–630, 654, 661, 345/680, 700, 723, 764, 765, 781–783, 530, 345/531, 554, 967; 382/276, 209, 284–286, 382/291–296, 307, 217, 214, 215, 103, 309, 382/310; 715/908, 902, 515–517, 520, 538; 717/108–110, 717/113, 116, 165; 358/1.18, 1.14, 112; 709/94

(56) References Cited

U.S. PATENT DOCUMENTS

| | | | | |
|---|---|---|---|---|
| 5,051,930 A | * | 9/1991 | Kuwabara et al. | 715/516 |
| 5,381,523 A | * | 1/1995 | Hayashi | 715/513 |
| 5,475,805 A | * | 12/1995 | Murata | 715/513 |
| 5,504,853 A | * | 4/1996 | Schuur et al. | 345/853 |
| 5,883,986 A | * | 3/1999 | Kopec et al. | 382/310 |
| 6,195,101 B1 | * | 2/2001 | Ghislain Bossut et al. | 345/629 |
| 6,282,330 B1 | * | 8/2001 | Yokota et al. | 382/309 |
| 6,323,876 B1 | * | 11/2001 | Rao et al. | 345/634 |
| 6,327,049 B1 | * | 12/2001 | Ohtsuka | 358/1.18 |
| 6,353,840 B2 | * | 3/2002 | Saito et al. | 715/517 |
| 6,529,214 B1 | * | 3/2003 | Chase et al. | 345/744 |
| 2003/0051022 A1 | * | 3/2003 | Sogabe et al. | 709/223 |

* cited by examiner

*Primary Examiner*—Matthew C. Bella
*Assistant Examiner*—Wesner Sajous
(74) *Attorney, Agent, or Firm*—Birch, Stewart, Kolasch & Birch, LLP

(57) ABSTRACT

In order to improve expressiveness of a template, the template is generated by using editing descriptions comprising valid area information for generating a composite image by using the template, an image layout command for specifying an image to be laid out in the valid area, and an image processing command for specifying the content of image processing to be carried out on the composite image and for specifying an area in which the processing is carried out. A composite-image generating apparatus generates the composite image based on the editing descriptions of the template.

28 Claims, 37 Drawing Sheets

FIG.2

```
EDITING DESCRIPTIONS OF                    T1
TEMPLATE

VALID AREA INFORMATION
   Left Bottom  = (0, 0)
   Right Bottom = (800, 0)
   Left Top     = (0, 1000)
   Right Top    = (800, 1000)
IMAGE LAYOUT COMMAND 1
   LAYOUT IMAGE Sample 0.bmp
   LAYOUT AREA alpha 0.bmp
IMAGE LAYOUT COMMAND 2
   LAYOUT IMAGE Sample 1.bmp
   LAYOUT AREA alpha 1.bmp
IMAGE PROCESSING COMMAND 1
   PROCESSING : WHITE FRINGE
   PROCESSING AREA : alpha 2.bmp
IMAGE PROCESSING COMMAND 2
   PROCESSING : REFLECTION
   PROCESSING AREA : alpha 3.bmp
IMAGE PROCESSING COMMAND 3
   PROCESSING : WAVE
   PROCESSING AREA : alpha 4.bmp
```

F I G. 4
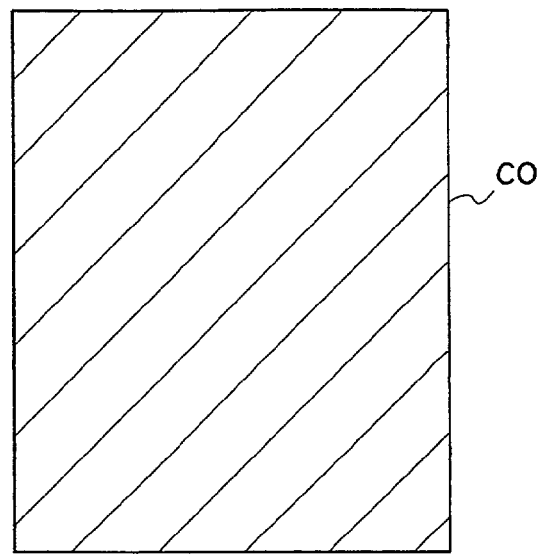
F I G. 5
F I G. 6
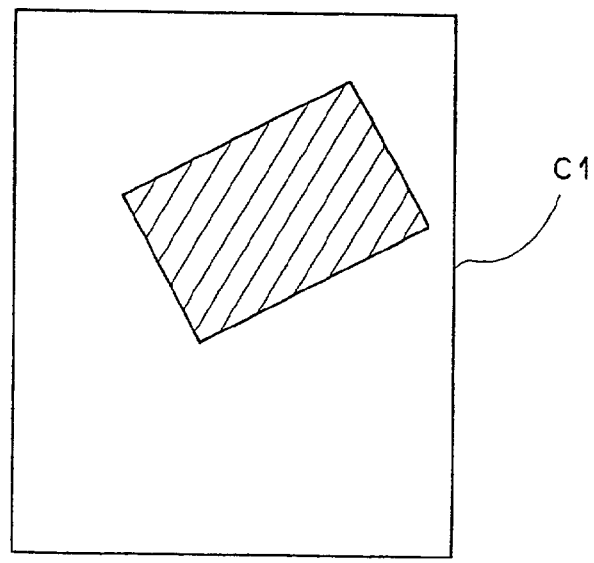

FIG.14

EDITING DESCRIPTIONS OF
TEMPLATE

VALID AREA INFORMATION
   Left Bottom   = (0, 0)
   Right Bottom= (800, 0)
   Left Top      = (0, 1000)
   Right Top    = (800, 1000)

IMAGE LAYOUT COMMAND 1
   LAYOUT IMAGE User 0.bmp
   LAYOUT AREA alpha 0.bmp

IMAGE LAYOUT COMMAND 2
   LAYOUT IMAGE User 1.bmp
   LAYOUT AREA alpha 1.bmp

IMAGE PROCESSING COMMAND 1
   PROCESSING : WHITE FRINGE
   PROCESSING AREA : alpha 2.bmp IMAGE PROCESSING COMMAND 2
   PROCESSING : REFLECTION
   PROCESSING AREA : alpha 3.bmp IMAGE PROCESSING COMMAND 3
   PROCESSING : WAVE
   PROCESSING AREA : alpha 4.bmp

EDITING DESCRIPTIONS OF TEMPLATE

VALID AREA INFORMATION
   Left Bottom　＝(0, 0)
   Right Bottom＝(800, 0)
   Left Top　　　＝(0, 1200)
   Right Top　　＝(800, 1200)
IMAGE LAYOUT COMMAND 1
   LAYOUT IMAGE Sample 5.bmp
   LAYOUT AREA alpha 5.bmp
IMAGE LAYOUT COMMAND 2
   LAYOUT IMAGE Sample 6.bmp
   LAYOUT AREA alpha 6.bmp
IMAGE LAYOUT COMMAND 3
   LAYOUT IMAGE Sample 7.bmp
   LAYOUT AREA alpha 7.bmp F I G . 19
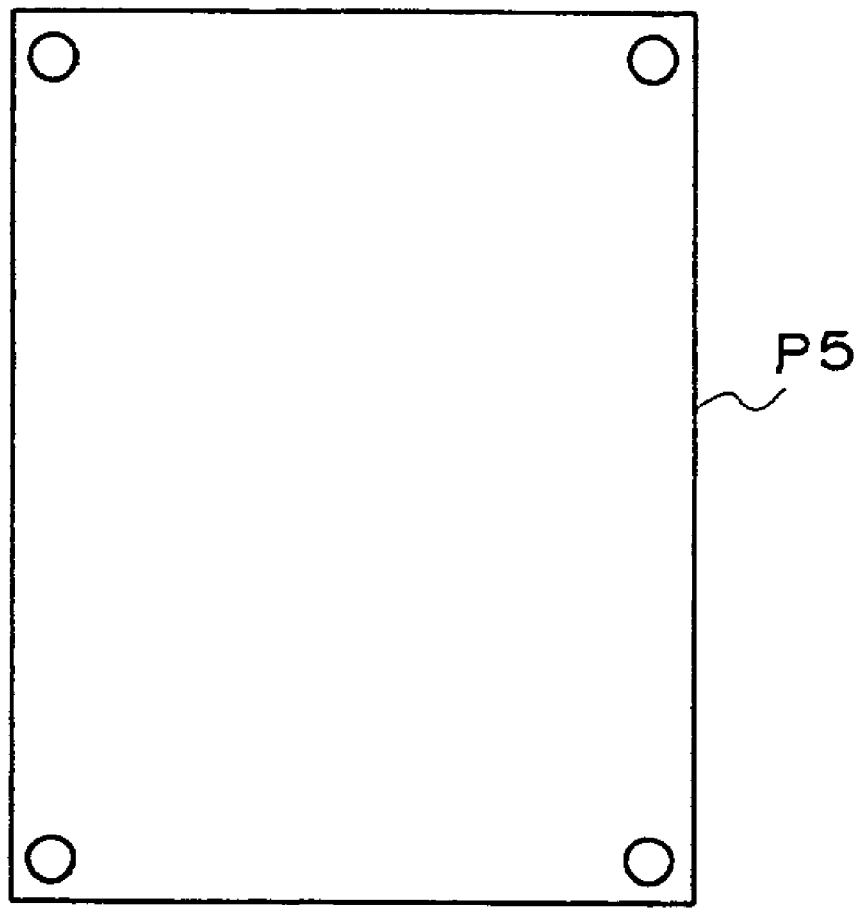

F I G. 20
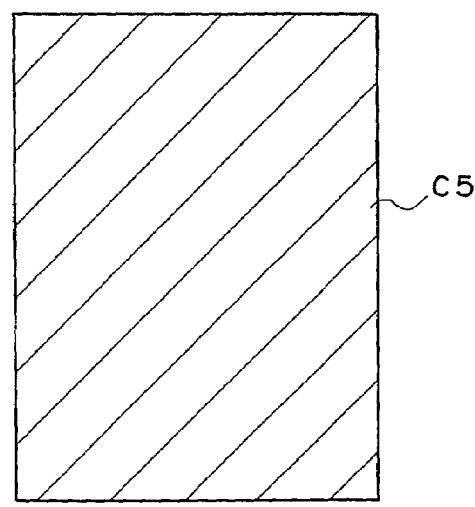
F I G. 21
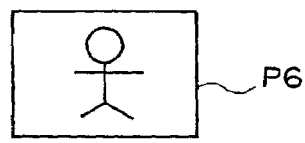
F I G. 22
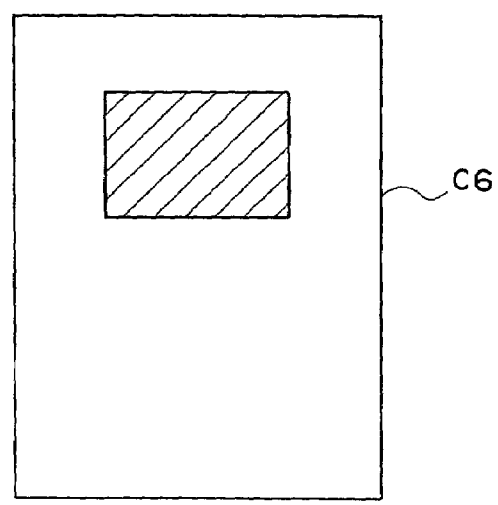
F I G. 23

FIG.28

```
EDITING DESCRIPTIONS OF
TEMPLATE

VALID AREA INFORMATION
    Left Bottom   = (0, 0)
    Right Bottom = (800, 0)
    Left Top      = (0, 1200)
    Right Top     = (800, 1200)
IMAGE LAYOUT COMMAND 1
    LAYOUT IMAGE User 5.bmp
    LAYOUT AREA alpha 5.bmp
IMAGE LAYOUT COMMAND 2
    LAYOUT IMAGE Sample 6.bmp
    LAYOUT AREA alpha 6.bmp
IMAGE LAYOUT COMMAND 3
    LAYOUT IMAGE Sample 7.bmp
    LAYOUT AREA alpha 7.bmp
```
T2

FIG.31

EDITING DESCRIPTIONS OF TEMPLATE — T2

VALID AREA INFORMATION
   Left Bottom   = (0, 0)
   Right Bottom = (800, 0)
   Left Top       = (0, 1200)
   Right Top    = (800, 1200)
IMAGE LAYOUT COMMAND 1
   LAYOUT IMAGE User 5.bmp
   LAYOUT AREA alpha 5.bmp
IMAGE LAYOUT COMMAND 2
   LAYOUT IMAGE User 6.bmp
   LAYOUT AREA alpha 6.bmp
IMAGE LAYOUT COMMAND 3
   LAYOUT IMAGE User 7.bmp
   LAYOUT AREA alpha 7.bmp F I G . 32
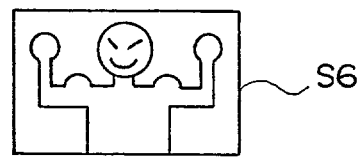
F I G . 33
F I G . 34
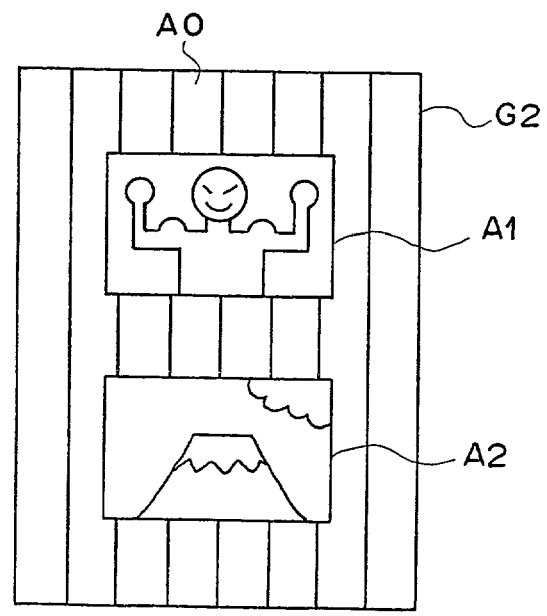

FIG.36

EDITING DESCRIPTIONS OF TEMPLATE

BASE IMAGE     Base 01.bmp
IMAGE INSERTION COMMAND
    INSERTION IMAGE : Sample 1.bmp
    INSERSION AREA : alpha 1.bmp
IMAGE PROCESSING COMMAND 1
    PROCESSING : WHITE FRINGE
    PROCESSING AREA : alpha 2.bmp
IMAGE PROCESSING COMMAND 2
    PROCESSING : REFLECTION
    PROCESSING AREA : alpha 3.bmp
IMAGE PROCESSING COMMAND 3
    PROCESSING : WAVE
    PROCESSING AREA : alpha 4.bmp

T3

F I G . 39
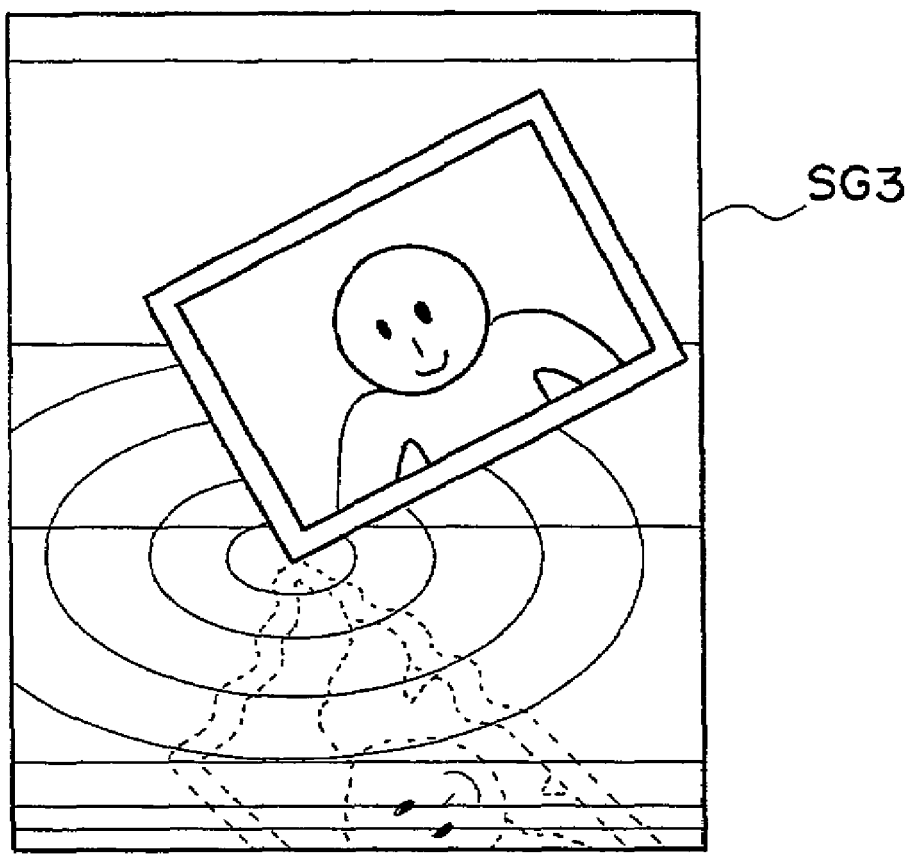

FIG.40

EDITING DESCRIPTIONS OF TEMPLATE

BASE IMAGE     Base 01.bmp
IMAGE INSERTION COMMAND
   INSERTION IMAGE : User 1.bmp
   INSERTION AREA : alpha 1.bmp
IMAGE PROCESSING COMMAND 1
   PROCESSING : WHITE FRINGE
   PROCESSING AREA : alpha 2.bmp
IMAGE PROCESSING COMMAND 2
   PROCESSING : REFLECTION
   PROCESSING AREA : alpha 3.bmp
IMAGE PROCESSING COMMAND 3
   PROCESSING : WAVE
   PROCESSING AREA : alpha 4.bmp

EDITING DESCRIPTIONS OF TEMPLATE

BASE IMAGE    Base 02.bmp

IMAGE INSERTION COMMAND 1

INSERTION IMAGE: Sample 6.bmp

INSERTION AREA: alpha 6.bmp

IMAGE INSERTION COMMAND 2

INSERTION IMAGE: Sample 7.bmp

INSERTION AREA: alpha 7.bmp

EDITING DESCRIPTIONS OF
TEMPLATE

BASE IMAGE    Base 02.bmp

IMAGE INSERTION COMMAND 1

INSERTION IMAGE: User 6.bmp

INSERTION AREA: alpha 6.bmp

IMAGE INSERTION COMMAND 2

INSERTION IMAGE: Sample 7.bmp

INSERTION AREA: alpha 7.bmp

EDITING DESCRIPTIONS OF TEMPLATE

BASE IMAGE    Base 02.bmp

IMAGE INSERTION COMMAND 1
  INSERTION IMAGE: User 6.bmp
  INSERTION AREA: alpha 6.bmp IMAGE INSERTION COMMAND 2
  INSERTION IMAGE: User 7.bmp
  INSERTION AREA: alpha 7.bmp

METHOD, APPARATUS AND RECORDING MEDIUM FOR GENERATING COMPOSITE IMAGE

BACKGROUND OF THE INVENTION

1. Field of the Invention

The present invention relates to a method and an apparatus for obtaining a composite image by laying out a plurality of images, and to a method and an apparatus for obtaining a composite image by using an image and a template. The present invention also relates to a computer-readable recording medium storing programs to cause a computer to execute these composite-image generation methods and to a computer-readable recording medium storing template data representing the template.

2. Description of the Related Art

Services such as generating a picture postcard for a new year's greeting by using a template comprising text and an illustration for the greeting and a blank space for inserting a photograph have been carried out. In order to generate such a postcard, a user brings an original image recorded on a negative film or the like to a DPE store and the DPE store converts the original image into digital image data. By composing the digital image data with template data representing a text position and a template, composite image data are obtained. The postcard is generated by printing a composite image based on the composite image data.

A template is defined as an image having RGBα channels, and printing is carried out after the composite image has been generated by inserting an image of a user or the like in the template or combining the image with the template. In this case, if a position of image insertion is specified in the template, the original image of the user's own can be added to a high-quality image generated by a designer, through image replacement.

The α channel is a channel for defining transparency of the image at a pixel position. Depending on a value of the α channel, a composition ratio between the image to be inserted and the template is changed. More specifically, the smaller the value of the α channel is, the more transparent the image of the template becomes. For example, by decreasing the value of the α channel near a boundary between the image to be inserted and the template, the image is composed with the template in such a manner that the image appears to be blended with the template. Therefore, if the α channel defines the transparency, a user image can be blended with the template and composition of the template and the image looks natural.

However, a conventional template is used for generating a composite image by inserting a user image in the template having a background predetermined in a laboratory. Therefore, a composite image having a background desired by a user cannot be generated.

Furthermore, if a conventional template is used, generation of a composite image followed by subsequent image processing by using another image processing apparatus is necessary in order to insert a user image reflected in a base image of the template or in order to carry out image processing such as adding a wavy pattern, since the conventional template is used only for insertion of the user image into the base image. Therefore, processing for generating the composite image is complicated.

Moreover, if there are two neighboring areas for image insertion in a template as shown in FIG. 47(a) and if an image to be inserted in one of the areas is larger than the area, the image extends beyond the area and partially covers the other area as shown in FIG. 47(b), since only one α channel is defined in the conventional template data.

SUMMARY OF THE INVENTION

The present invention has been conceived based on consideration of the above problems. An object of the present invention is therefore to provide a composite-image generation method and a composite-image generating apparatus for enabling a user to obtain a composite image having a desired background.

Another object of the present invention is to provide an image processing method and an image processing apparatus enabling not only image insertion but also image processing with ease.

Still another object of the present invention is to provide an image processing method and an image processing apparatus for not causing an insertion image to extend beyond an insertion area therefor in the case where a plurality of image insertion areas exist in a template.

Yet another object of the present invention is to provide a computer-readable recording medium storing template data representing the templates used in the image processing methods and in the image processing apparatus described above.

A first computer-readable recording medium of the present invention stores template data representing a template including:

an editing description for setting a valid area in a two-dimensional plane; and editing descriptions respectively specifying a plurality of layout areas in the valid area and specifying a plurality of layout images laid out in the respective layout areas.

It is preferable for the template to further include at least one editing description respectively specifying the content of image processing carried out on any one of the layout images.

The "valid area" herein referred to is an area in which the composite image having the layout images therein is formed, that is, an area specifying a range of the composite image.

The "layout images" refer to an image to be used as a background of the composite image and images to be laid out with the background image.

The "editing descriptions for specifying the layout areas" can be α channel data for specifying the layout areas in the valid area. Alternatively, the editing descriptions can be link information specifying locations of data comprising only the α channel data specifying the layout areas.

The "editing descriptions for specifying the layout images" include at least a description for causing a computer to execute processing to facilitate a user to specify the layout images by operating the computer while referring to the descriptions when the computer reads the template data. In addition to the above descriptions, the editing descriptions may include descriptions specifying file names of image data representing the layout images, and descriptions specifying locations of the image data. An image having been subjected to processing according to the descriptions may be used as the "layout image". In this case, as the image having been subjected to the processing, not only an image on which the processing according to the descriptions has been completed but also an image having been partially subjected to processing may be used.

The "editing descriptions specifying the layout images" may specify file names of sample images predetermined as default so that the user can confirm a composite image in which the sample images are laid out.

A second computer-readable recording medium of the present invention stores template data representing a template including:

an editing description for specifying a base image; and editing descriptions respectively specifying a plurality of insertion areas in the base image and specifying a plurality of insertion images to be inserted in the respective insertion areas.

In the second computer-readable recording medium of the present invention, it is preferable for the template to further include at least one editing description respectively specifying the content of image processing to be carried out on the base image and/or any one of the insertion images.

A third computer-readable recording medium of the present invention stores template data representing a template including:

an editing description for specifying a base image;

at least one editing description respectively specifying an insertion area in the base image and specifying an insertion image to be inserted in the insertion area; and at least one editing description respectively specifying the content of image processing to be carried out on the base image and/or the insertion image.

In the template in the third recording medium, the number of insertion images in the composite image can be 1 or more.

The "base image" herein referred to is an image to be used as a background of the template, and the "editing description for specifying the base image" is a description for specifying a file name indicating image data representing the image used as the background of the template or a description specifying link information to a location of the image data. An image having been processed according to the editing descriptions may be used as the base image. In this case, as the image having been subjected to the processing, not only an image on which the processing according to the editing descriptions has been completed but also an image having been partially subjected to the processing may be used.

The "editing descriptions respectively specifying the insertion areas" can be α channel data for specifying the insertion areas. Alternatively, the editing descriptions can be link information specifying locations of data comprising only the α channel data specifying the insertion areas in the base image.

The "editing descriptions respectively specifying the insertion images" are descriptions for causing a computer to execute processing to facilitate specification of the insertion images by the user operating the computer while referring to the descriptions when the computer reads the template data. As the "descriptions respectively specifying the insertion images", descriptions specifying file names of the insertion images are used. However, file names of sample images predetermined as default may be specified so that the user can confirm the content of the template by being shown a composite image generated from the template and the sample images.

The "at least one editing description respectively specifying the content of image processing" describes the content of image processing such as adding a white fringe to the layout image or to the insertion image, processing for reflecting the layout image or the insertion image in an area in the base image, and processing to form a wavy pattern, for example. The at least one editing description respectively specifying the content of image processing also describes an area for the processing. When the template data are read by the computer, the computer executes the image processing according to the at least one editing description.

A first composite-image generation method of the present invention is a method of generating a composite image having a plurality of layout images based on template data representing a template including:

an editing description for setting a valid area in a two-dimensional plane; and editing descriptions respectively specifying a plurality of layout areas in the valid area and specifying the plurality of layout images laid out in the respective layout areas. The first composite-image generation method comprises the steps of:

setting the valid area based on the editing description for setting the valid area;

receiving specification of the layout images based on the editing descriptions specifying the layout images; and laying out the layout images based on the editing descriptions specifying the layout areas.

In the first composite-image generation method of the present invention, it is preferable for the template to further include at least one editing description respectively specifying the content of image processing to be carried out on any one of the layout images so that the composite image can be obtained after carrying out the image processing based on the at least one editing description specifying the content of the image processing.

A second composite-image generation method of the present invention is a method of generating a composite image having a plurality of insertion images inserted in a base image based on template data representing a template including:

an editing description for specifying the base image; and editing descriptions respectively specifying a plurality of insertion areas in the base image and specifying the plurality of insertion images to be inserted in the respective insertion areas. The second composite-image generation method comprises the steps of:

receiving specification of the insertion images based on the editing descriptions specifying the insertion images; and inserting the insertion images in the respective insertion areas in the base image based on the editing description specifying the base image and based on the editing descriptions specifying the insertion areas.

In the second composite-image generation method of the present invention, it is preferable for the template to further include at least one editing description respectively specifying the content of image processing to be carried out on the base image and/or any one of the insertion images so that the composite image can be obtained after carrying out the image processing based on the at least one editing description specifying the content of the image processing.

A third composite-image generation method of the present invention is a method of generating a composite image having at least one insertion image inserted in a base image based on template data representing a template including:

an editing description for specifying the base image;

at least one editing description respectively specifying each one of at least one insertion area in the base image and specifying one of the at least one insertion image to be inserted in the insertion T1 in the first embodiment. As shown in FIG. 2, the editing descriptions of the template T1 comprise a valid area information description for specifying a valid area for generating the composite image, image layout commands 1 and 2 for specifying images to be laid out, and image processing commands 1, 2, and 3 for specifying the content of image processing to be carried out on the composite image.

The valid area information description specifies coordinates of four corners for generating the composite image in a two-dimensional coordinate system. In this embodiment, a rectangular area having vertices Bottom Left (0,0), Bottom Right (800, 0), Top Left (0,1000), and Top Right (800, 1000) is specified as the valid area.

The image layout command descriptions specify images to be laid out and specify layout areas in which the layout images are laid out. The image layout command 1 specifies an image used as a background of the template T1 as a layout image (called L1 here). Before the user specifies the image, a file name "Sample0.bmp" of sample data P0 representing a predetermined sample image shown in FIG. 3 is specified. Meanwhile, in the layout area description portion of the image layout command 1, a file name of α channel data specifying an area in which the layout image L1 is laid out in the valid area is specified. A file name "alpha0.bmp" of α channel data C0 causing a value of the entire valid area to become 1 as shown in FIG. 4 is specified.

Meanwhile, the description of the image layout command 2 specifies an image to be laid out in the valid area as a layout image (called L2 here). As shown in FIG. 5, before the user specifies the area; and at least one editing description respectively specifying the content of image processing to be carried out on the base image and/or any one of the at least one insertion image. The third composite-image generation method comprises the steps of:

receiving specification of the at least one insertion image based on the at least one editing description specifying the insertion image;

inserting the at least one insertion image in the at least one insertion area in the base image based on the editing description specifying the base image and based on the at least one editing description specifying the insertion area; and carrying out the image processing based on the at least one editing description specifying the content of the image processing.

A first composite-image generating apparatus of the present invention is an apparatus for generating a composite image having a plurality of layout images based on template data representing a template including:

an editing description for setting a valid area in a two-dimensional plane; and editing descriptions respectively specifying a plurality of layout areas in the valid area and specifying the plurality of layout images to be laid out in the respective layout areas. The first composite-image generating apparatus comprises:

setting means for setting the valid area based on the editing description for setting the valid area;

reception means for receiving specification of the layout images based on the editing descriptions specifying the layout images; and composition means for generating the composite image by laying out the layout images based on the editing descriptions specifying the layout areas.

In the first composite-image generating apparatus of the present invention, it is preferable for the template to further include at least one editing description respectively specifying the content of image processing to be carried out on any one of the layout images so that the composition means can obtain the composite image after carrying out the image processing based on the at least one editing description specifying the content of the image processing.

A second composite-image generating apparatus of the present invention is an apparatus for generating a composite image having a plurality of insertion images inserted in a base image based on template data representing a template including:

an editing description for specifying the base image; and editing descriptions respectively specifying a plurality of insertion areas in the base image and for specifying the plurality of insertion images to be inserted in the respective insertion areas. The second composite-image generating apparatus comprises:

reception means for receiving specification of the insertion images based on the editing descriptions specifying the insertion images; and composition means for generating the composite image by inserting the insertion images in the insertion areas in the base image based on the editing description specifying the base image and based on the editing descriptions specifying the insertion areas.

In the second composite-image generating apparatus of the present invention, it is preferable for the template to further include at least one editing description respectively specifying the content of image processing to be carried out on the base image and/or any one of the insertion images so that the composition means can obtain the composite image after carrying out the image processing based on the editing description or descriptions specifying the content of the image processing.

A third composite-image generating apparatus of the present invention is an apparatus for generating a composite image having at least one insertion image inserted in a base image based on template data representing a template including:

an editing description for specifying the base image;

at least one editing description respectively specifying each one of at least one insertion area in the base image and specifying one of the at least one insertion image to be inserted in the insertion area; and at least one editing description respectively specifying the content of image processing to be carried out on the base image and/or any one of the at least one insertion image. The third composite-image generating apparatus comprises:

reception means for receiving specification of the at least one insertion image based on the at least one editing description specifying the insertion image;

composition means for inserting the at least one insertion image in the at least one insertion area in the base image based on the editing description specifying the base image and based on the at least one editing description specifying the insertion area and for obtaining the composite image by carrying out the image processing based on the at least one editing description specifying the content of the image processing.

The composite-image generation methods of the present invention may be provided in the form of a computer-readable recording medium storing programs to cause a computer to execute the composite-image generation methods.

When the first recording medium storing the template of the present invention is used, the plurality of the layout images are laid out in the valid area by causing a compute to read the template data stored in the recording medium. In the editing descriptions specifying the layout images, descriptions for causing a user to specify the layout images are included. Therefore, the user can use a desired one of the layout image as the background of the composite image. In this manner, the user can obtain the composite image having the desired background.

By using the template having the at least one editing description respectively specifying the content of the image processing, a computer can carry out the image processing according to the content, and the user can obtain the composite image having been subjected to the image processing according to the template on the desired layout image or images only by specifying the layout image or images. Therefore, the composite image generated by using the template has improved expressiveness.

When the second recoding medium storing the template is used, by causing a computer to read the template data stored in the recording medium, processing to facilitate insertion of the insertion images is carried out by the computer. In this manner, the user can insert the insertion images in the insertion areas in the template based on an instruction from the computer. At this time, since the insertion areas are specified one by one, none of the images inserted in the corresponding insertion area extend over another one of the insertion areas.

Furthermore, by using the template having the at least one editing description respectively specifying the content of the image processing, a computer can carry out the image processing according to the content, and the user can obtain the composite image having been subjected to the image processing according to the template only by specifying the insertion images. Therefore, the composite image generated by using the template has improved expressiveness.

When the third recording medium storing the template of the present invention is used, by causing a computer to read the template data stored in the recording medium, processing to facilitate insertion of the insertion image is carried out by the computer. In this manner, a user can insert the at least one insertion image in the at least one insertion area in the template based on an instruction from the computer. Furthermore, since the template has the at least one editing description respectively specifying the content of the image processing, the computer can carry out the image processing according to the content, and the user can obtain the composite image having been subjected to the image processing according to the template simply by specifying the at least one insertion image. Therefore, the composite image generated by using the template has improved expressiveness.

BRIEF DESCRIPTION OF THE DRAWINGS

FIG. 2 shows the content of editing descriptions in a template in the first embodiment;

FIG. 4 shows a layout area C0 of the sample image P0;

FIG. 5 shows a sample image P1 used in the first embodiment;

FIG. 6 shows a layout image C1 in the first embodiment;

FIG. 14 shows the template whose editing descriptions have been changed;

FIG. 18 shows the content of editing descriptions in a template in a second embodiment;

FIG. 19 shows a sample image P5 used in the second embodiment;

FIG. 20 shows a layout area in the second embodiment;

FIG. 21 shows a sample image P6 used in the second embodiment;

FIG. 22 shows a layout area C6 in the second embodiment;

FIG. 23 shows a sample image P7 used in the second embodiment;

FIG. 28 shows the template whose editing description has been changed;

FIG. 31 shows the template whose editing descriptions have been changed;

FIG. 32 shows a user image S6 used in the second embodiment;

FIG. 33 shows a user image S7 used in the second embodiment;

FIG. 34 shows a state in which the user images have been laid out in areas A1 and A2;

FIG. 36 shows the content of editing descriptions in a template used in the third embodiment;

FIG. 39 shows a sample composite image;

FIG. 40 shows the template whose editing description has been changed;

FIG. 41 shows the content of editing descriptions of a template used in a fourth embodiment;

FIG. 44 shows the template whose editing description has been changed;

FIG. 46 shows the template whose editing description has been changed; and

DESCRIPTION OF THE PREFERRED EMBODIMENTS

Hereinafter, embodiments of the present invention will be explained with reference to the accompanying drawings.

Figure 1:
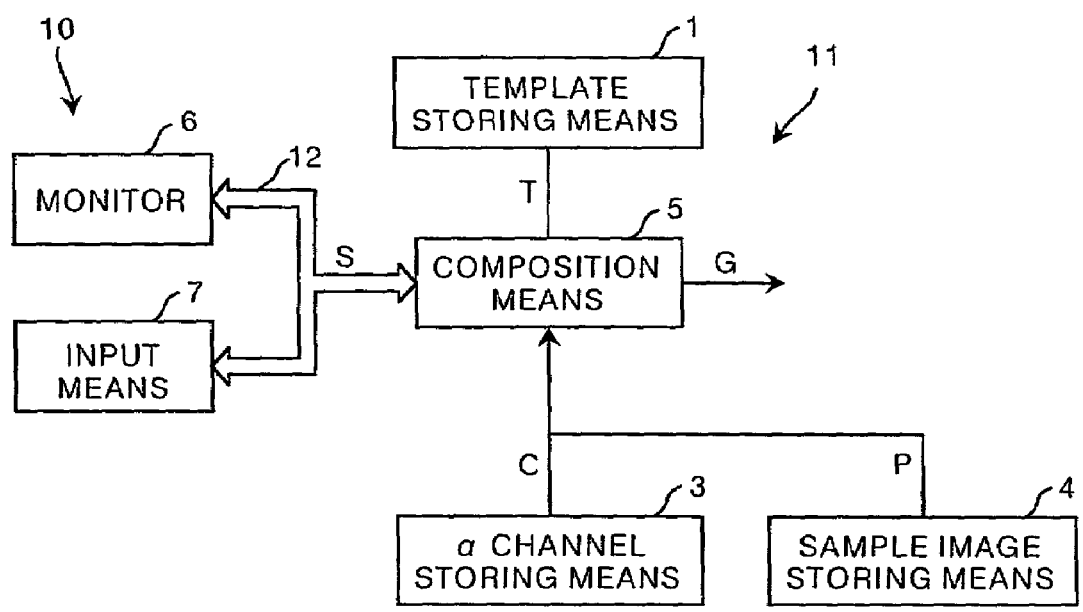
FIG. 1 is a block diagram showing an outline configuration of an image composition system adopting a composite-image generating apparatus as a first embodiment of the present invention.

FIG. 1 is a block diagram showing an outline configuration of a system including a composite-image generating apparatus as a first embodiment of the present invention. As shown in FIG. 1, the image composition system including the composite-image generating apparatus according to the first embodiment comprises template storing means 1 for storing a plurality of sets of template data T each representing a template comprising editing descriptions (hereinafter, the template is also represented by T), $\alpha$ channel storing means 3 for storing $\alpha$ channel data C for specifying a layout area in which a layout image described in the template T is laid out, sample image storing means 4 for storing sample image data P representing a sample image to be laid out in the layout area (hereinafter, the sample image is also represented by P) before the layout image described in the template T is specified, composition means 5 for obtaining composite image data G representing a composite image (hereinafter the composite image is also represented by G) by laying out an image represented by image data S owned by a user based on the descriptions in the template T (the composition means 5 corresponds to the setting means, the reception means, and the composition means in the first composite-image generating apparatus described above), a monitor 6 for displaying a state of image composition or the like, and input means 7 comprising a keyboard and a mouse for inputting a command from the user to the composition means 5. In this embodiment, the monitor 6 and the input means 7 comprise a user terminal 10 and the composition means 5 comprises a laboratory server 11. The user terminal 10 and the laboratory server 11 are connected to each other via a network 12.

The template storing means 1 stores the sets of template data T. In the template storing means 1, thumbnail image data representing thumbnail images of the templates represented by the sets of template data T are stored. The thumbnail image data includes link information to each set of the template data T. The composition means 5 reads the thumbnail image data from the template storing means 1 and transfers the data to the user terminal 10 based on a command from the user terminal 10. In this manner, the thumbnail images of the templates are shown on the monitor 6 of the user terminal 10. When a user selects a desired one of the templates (hereinafter called a template T1 in the first embodiment) from the thumbnail images displayed on the monitor 6, the composition means 5 generates a composite image by using the selected template T1 and an image of the user.

FIG. 2 shows the content of editing descriptions in the template image, a file name "Sample1.bmp" of sample image data P1 representing a predetermined sample image is specified. The layout area description portion in the image layout command 2 specifies a file name of $\alpha$ channel data specifying an area in which the layout image L2 is laid out in the valid area. In this embodiment, a file name "alpha1.bmp" of $\alpha$ channel data C1 causing a value of a hatched area in the valid area in FIG. 6 to become 1 and causing a value of the other area to become 0 as shown in FIG. 6 is specified.

Figure 7:
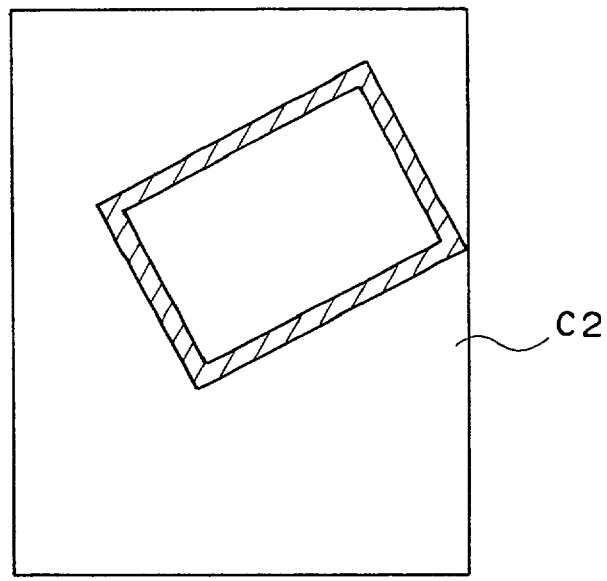
FIG. 7 shows a processing area in an image processing command 1.

The descriptions of the image processing commands describe the content of image processing and a processing area for specifying an area in which the image processing is carried out. In the image processing command 1, the processing content specifies "white fringe" for adding a white fringe around the layout image L2. The description portion of the processing area specifies a file name of $\alpha$ channel data for specifying the area in which the image processing is carried out. In this embodiment, as shown in FIG. 7, a file name "alpha2.bmp" of $\alpha$ channel data C2 causing a value of an area surrounding the layout image L2 to become 1 and causing a value of the other area to become 0 is specified.

Figure 8:
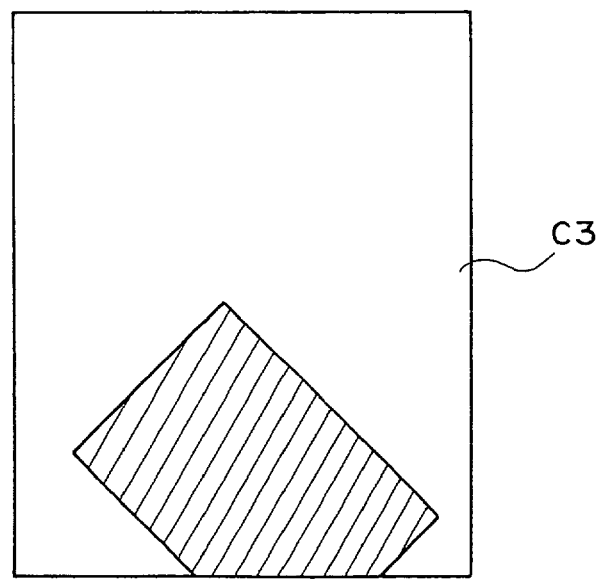
FIG. 8 shows a processing area in an image processing command 2.

In the image processing command 2, the content of processing specifies "reflection" for generating a reflection image of the layout image L2. The description portion of the processing area specifies a file name "alpha3.bmp" of $\alpha$ channel data C3 causing a value of an area in which the reflection image is generated to become 1 and causing a value of the other area to become 0 is specified, as shown in FIG. 8.

Figure 9:
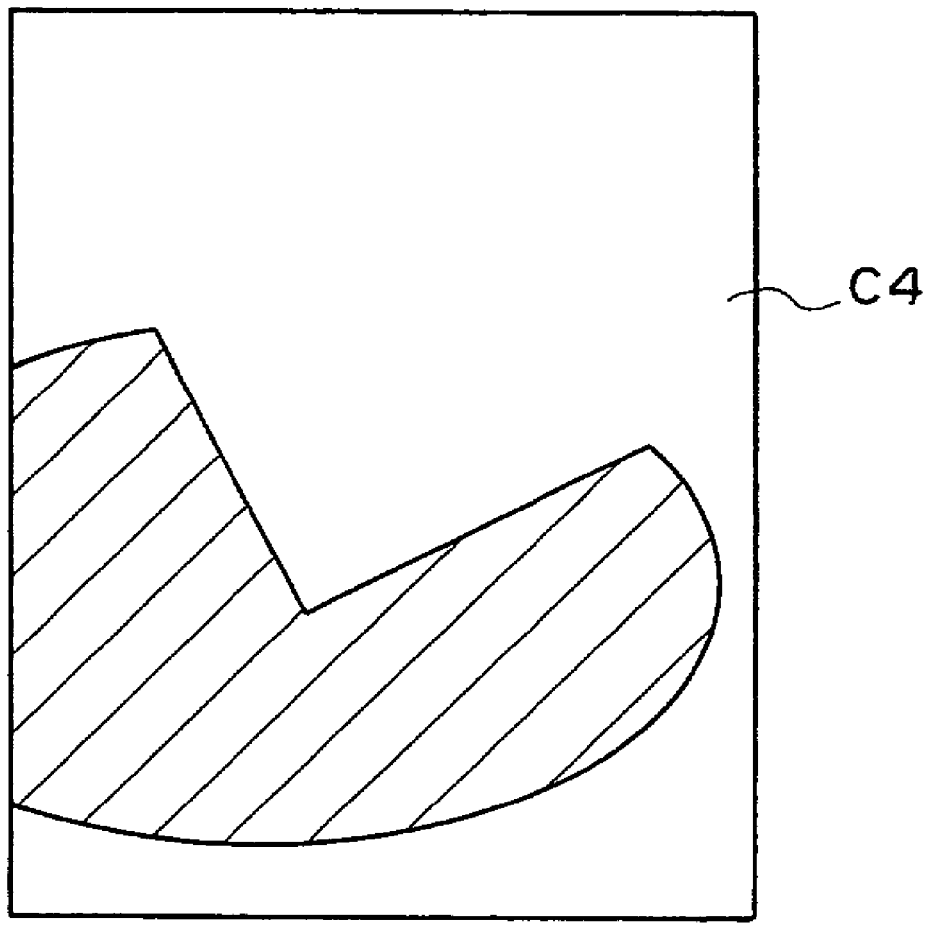
FIG. 9 shows a processing area in an image processing command 3.

In the image processing command 3, the processing content specifies "wave" for causing the image to look wavy. The description portion of the processing area specifies a file name "alpha4.bmp" of $\alpha$ channel data C4 causing a value of a hatched area in FIG. 9 to become 1 and causing a value of the other area to become 0.

Figure 10:
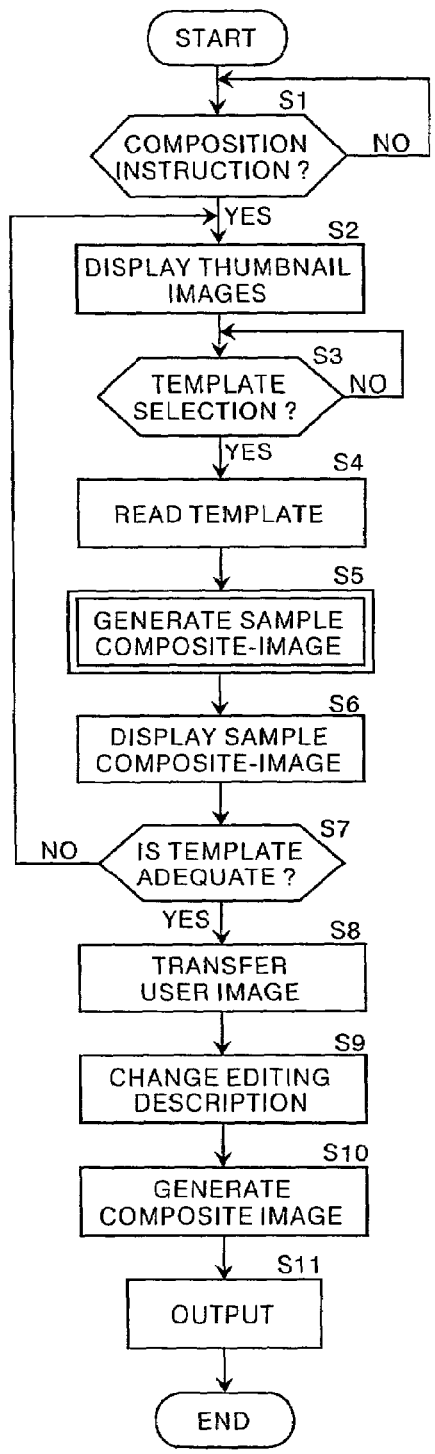
FIG. 10 is a flow chart showing processing carried out in the first embodiment.
Figure 11:
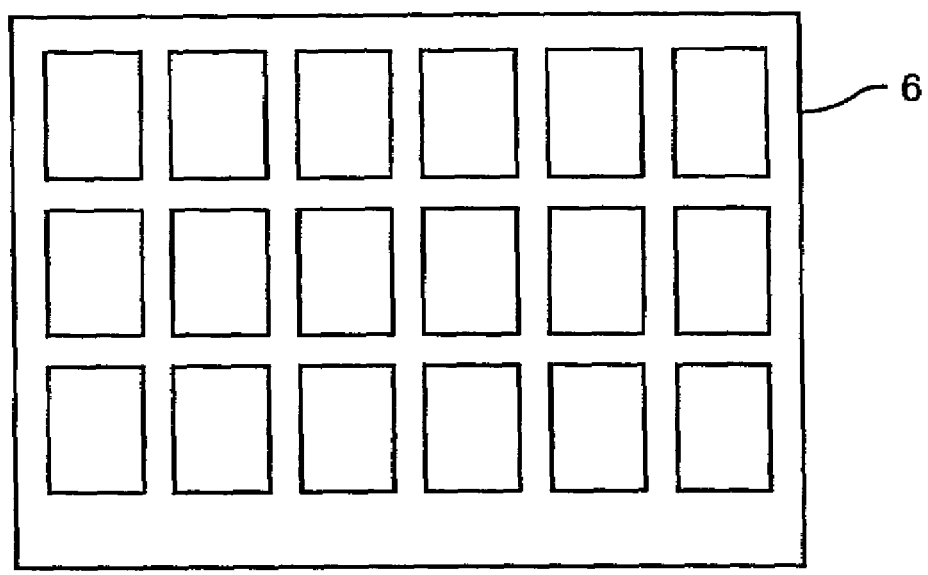
FIG. 11 shows thumbnail images displayed on a monitor.

An operation of the first embodiment will be explained next. FIG. 10 is a flow chart showing the operation of the first embodiment. The user inputs from the input means 7 a composite-image generation instruction to lay out the user images in the template T, by using the user terminal 10 (Step S1). This command is transferred to the laboratory server 11 via the network 12. The thumbnail image data stored in the template storing means 1 are transferred to the user terminal 10 and the thumbnail images represented by the thumbnail image data are displayed on the monitor 6 as shown in FIG. 11 (Step S2). The thumbnail images displayed on the monitor 6 include the link information to the templates T stored in the template storing means 1. The user selects a desired one of the templates, that is, the template T1, from the thumbnail images displayed on the monitor 6 and inputs this selection from the input means. This selection is input by clicking on the thumbnail image of the desired template T1 by using the mouse, for example. When this selection is carried out (Step S3), the template data T1 representing the template having been selected are read from the template storing means 1 based on the link information and input to the composition means 5 (Step S4). In the composition means 5, according to the editing descriptions of the template T1, a sample composite image SG1 is generated from the sample images P0 and P1 and the template T1 (step S5).

Figure 3:
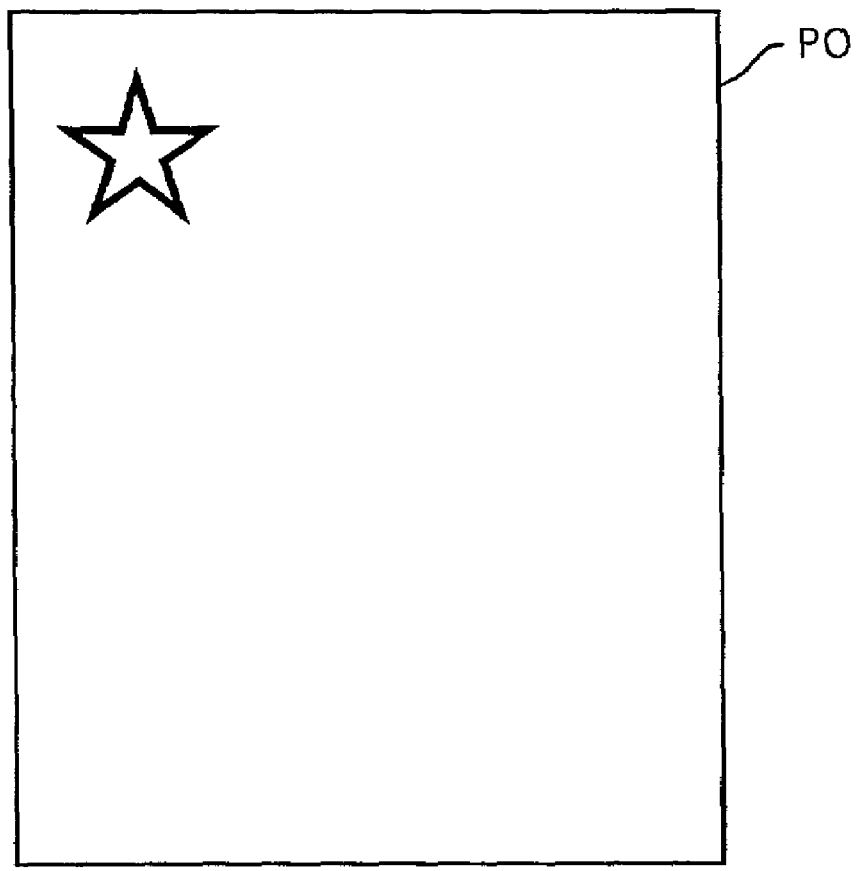
FIG. 3 shows a sample image P0 used in the first embodiment.
Figure 12:
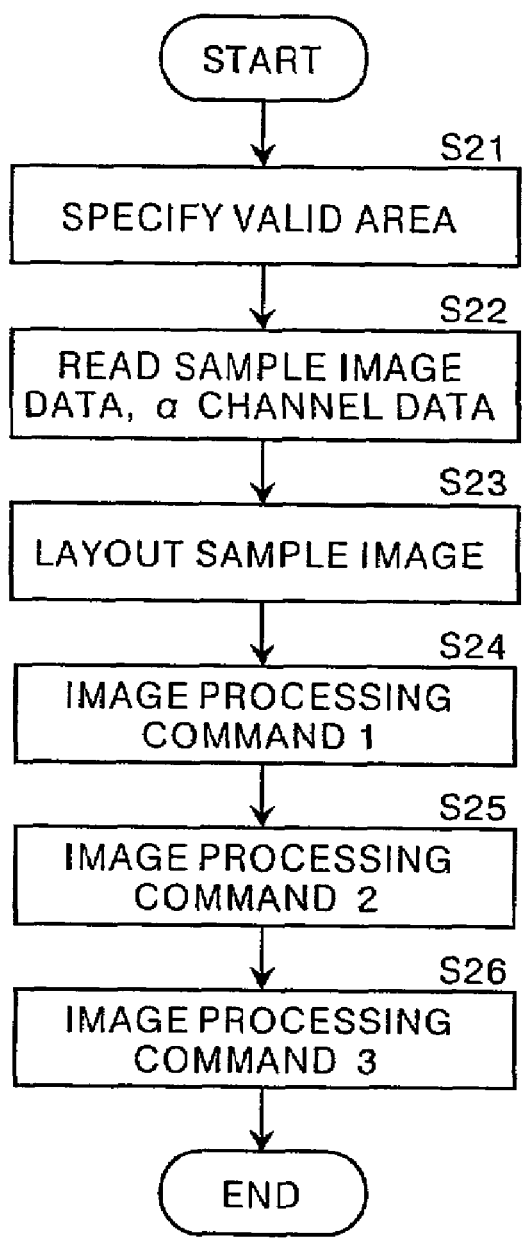
FIG. 12 is a flow chart showing sample composite-image generation processing.

A flow chart of this sample composite-image generation processing is shown in FIG. 12. Based on the description of the valid area information of the template T1, the valid area in which the composite image is generated is specified (step S21). Based on the descriptions of the image layout commands 1 and 2, the sample image data P0 and P1 representing the sample images and the $\alpha$ channel data C0 and C1 are read from the sample image storing means 4 and from the $\alpha$ channel storing means 3 (Step S22). The sample image P0 represented by the sample image data P0 (see FIG. 3) is laid out in the area determined by the cr channel data C0 (see FIG. 4) in the valid area, while the sample image P1 represented by the sample image data P1 (see FIG. 5) is laid out in the area determined by the a channel data C1 (see FIG. 6) in the valid area (Step S23).

The image processing command 1 is then carried out (Step S24). The image processing command 1 describes the processing to add the white fringe to the surrounding area of the layout image L2 (see FIG. 7). As a result of this command, the white fringe is added to the sample image P1 which is the layout image L2. The image processing command 2 is then carried out (Step S25). The image processing command 2 describes the processing to form the reflection image of the layout image L2 having the white fringe in the area shown in FIG. 8. The reflection image of the sample image P1 which is the layout image L2 having the white fringe is then formed in the area shown in FIG. 8. The image processing command 3 is then carried out (Step S26). The image processing command 3 is to cause the image in the area shown in FIG. 9 to look wavy.

Figure 13:
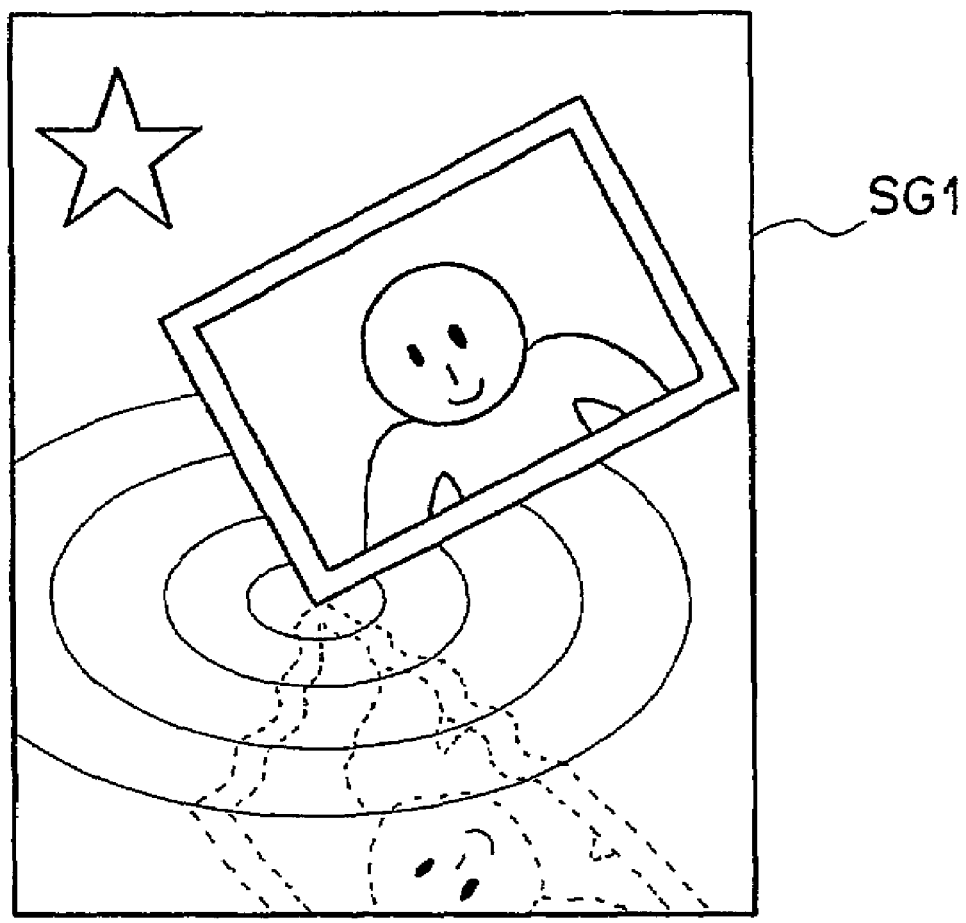
FIG. 13 shows a sample composite image.

The sample composite image SG1 shown in FIG. 13 is generated by the sample composite-image generation processing described above. Sample composite-image data representing the sample composite image SG1 are transferred to the user terminal 10 and displayed on the monitor 6 (Step S6). The user views the sample composite image SG1 displayed on the monitor 6 and confirms whether or not the template T1 is adequate for the composite image generation. In the case where the template T1 is adequate, this judgment is input from the input means 7 (Step S7), and the procedure advances to subsequent processing. Meanwhile, in the case where the template T1 needs to be changed, this judgment is input from the input means 7. A result at Step S7 becomes negative and the procedure returns to Step S2. The procedure from Step S2 to Step S7 is then repeated.

Figure 15:
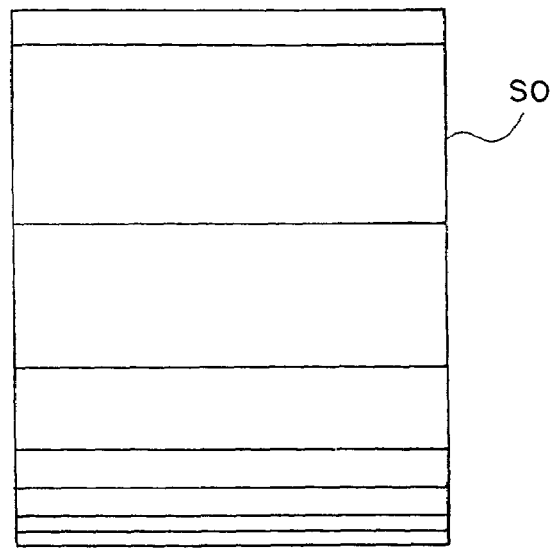
FIG. 15 shows a user image S0 used in the first embodiment.
Figure 16:
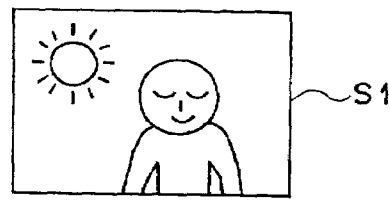
FIG. 16 shows a user image S1 used in the first embodiment.
Figure 17:
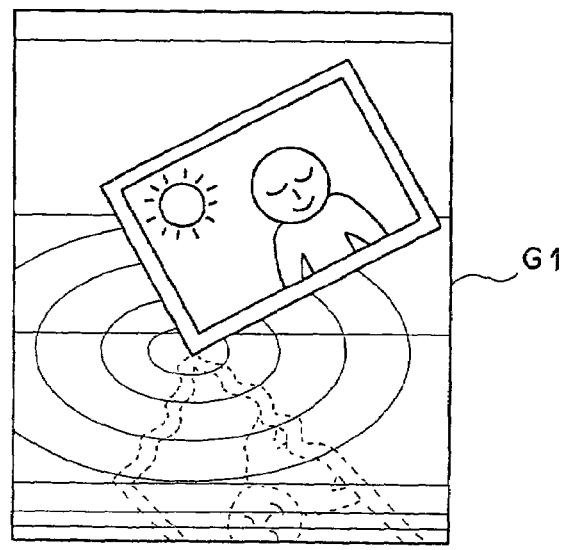
FIG. 17 shows a composite image in the first embodiment.

In the case where the template to be used is the template T1, an instruction to prompt the user to specify the user images is transferred from the composition means 5 to the user terminal 10. A command prompting the specification of the user images, such as "select user image", is then displayed on the monitor 6, for example. The user specifies the user images to be used for layout and transfers user image data S0 and S1 representing the user images (file names "User0.bmp" and "User1.bmp") to the laboratory server 11 (Step S8). At this time, an instruction to change the file names of the layout images L1 and L2 in the image layout commands 1 and 2 to "User0.bmp" and "User1.bmp" is also transferred. In the case where the user image data S0 and S1 are stored in the laboratory server 11, the user only has to specify the file names of the user image data S0 and S1. The composition means 5 receives the user image data S0 and S1 and changes the file names of the layout images L1 and L2 in the template T1 from "Sample0.bmp" and "Sample1.bmp" to "User0.bmp" and "User1.bmp" (Step S9). FIG. 14 shows the template T1 after the description change. After the descriptions of the template T1 have been changed in the above manner, a composite image G1 is generated according to the editing descriptions having been changed (Step S10). In the case where the user images represented by the user image data S0 and S1 are as shown in FIG. 15 and FIG. 16 respectively, the composite image G1 obtained through the processing at Step S10 is as shown in FIG. 17. After the composite image G1 has been generated in the above manner, composite image data G1 representing the composite image G1 are output (Step S11), and the processing is completed.

Confirmation of the composition result by the user may be prompted by transferring the composite image data G1 to the user terminal 10 before the output of the composite image data G1.

As has been described above, in the first embodiment, the composite image G1 is generated based on the template T1 comprising the editing descriptions. Therefore, the user images S0 and S1 can be laid out and the image processing can be carried out on the user images S0 and S1 according to the editing descriptions in the template T1. As a result, expressiveness of the composite image using the template T1 is improved and the user can obtain the composite image G1 having been subjected to the image processing and including the desired background, simply by specifying the user images S0 and S1.

A second embodiment of the present invention will be explained next. FIG. 18 shows editing descriptions of a template T2 used in the second embodiment. As shown in FIG. 18, the editing descriptions of the template T2 comprise a description of valid area information specifying a valid area for composite-image generation and image layout commands 1 to 3 for specifying images to be laid out. The editing descriptions do not include an image processing command. In the second embodiment, a configuration of an image composition system is the same as the configuration of the image composition system in the first embodiment shown in FIG. 1. Therefore, detailed explanation thereof is omitted here.

In the template T2 used in the second embodiment, the description of valid area information specifies coordinates of four corners in a two-dimensional coordinate system for composite-image generation therein. In this embodiment, a rectangular area having four corners Bottom Left (0,0), Bottom Right (800, 0), Top Left (0,1200), and Top Right (800, 1200) is specified as the valid area.

The image layout command 1 specifies an image to become a background of the template T2 as a layout image (called L5 here). Before a user specifies the image, a file name "Sample5.bmp" of sample image data P5 representing a predetermined sample image shown in FIG. 19 is specified. Meanwhile, a layout area description portion in the image layout command 1 specifies a file name of α channel data specifying an area in which the layout image L5 is laid out in the valid area. A file name "alpha5.bmp" which is a file name of α channel data C5 causing all values in the valid area to become 1 as shown in FIG. 20 is specified.

A description in the image layout command 2 specifies an image to be laid out in the valid area as a layout image (called L6 here). Before the user specifies the image, a file name "Sample6.bmp" of sample image data P6 representing a predetermined sample image shown in FIG. 21 is specified. Meanwhile, a layout area description portion specifies a file name of α channel data specifying an area in which the layout image L6 is laid out in the valid area. A file name "alpha6.bmp" which is a file name of α channel data C6 causing a value of a hatched area in FIG. 22 to become 1 and causing a value of the other area to become 0 is specified.

Figure 24:
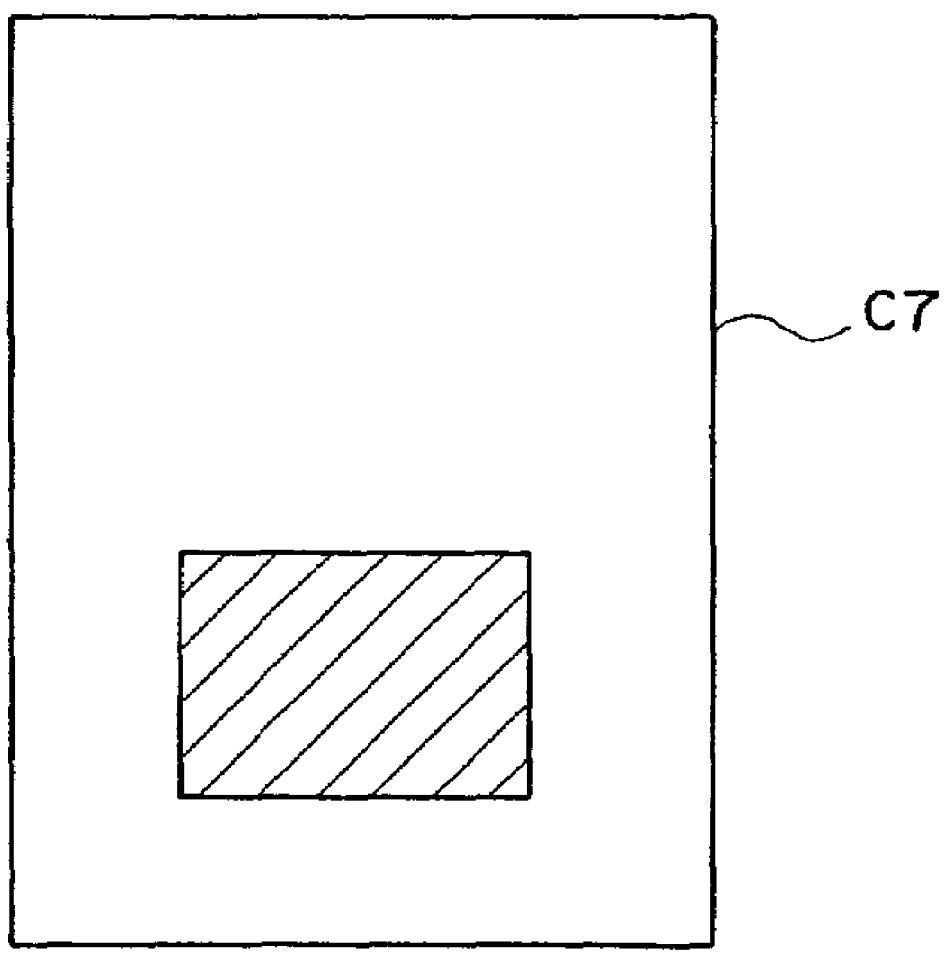
FIG. 24 shows a layout area C7 in the second embodiment.

A description in the image layout command 3 specifies an image to be laid out in the valid area as a layout image (called L7 here). Before the user specifies the image, a file name "Sample7.bmp" of sample image data P7 representing a predetermined sample image shown in FIG. 23 is specified. Meanwhile, a layout area description portion specifies a file name of α channel data specifying an area in which the layout image L7 is laid out in the valid area. A file name "alpha7.bmp" which is a file name of α channel data C7 causing a value of a hatched area in FIG. 24 to become 1 and causing a value of the other area to become 0 is specified.

Figure 25:
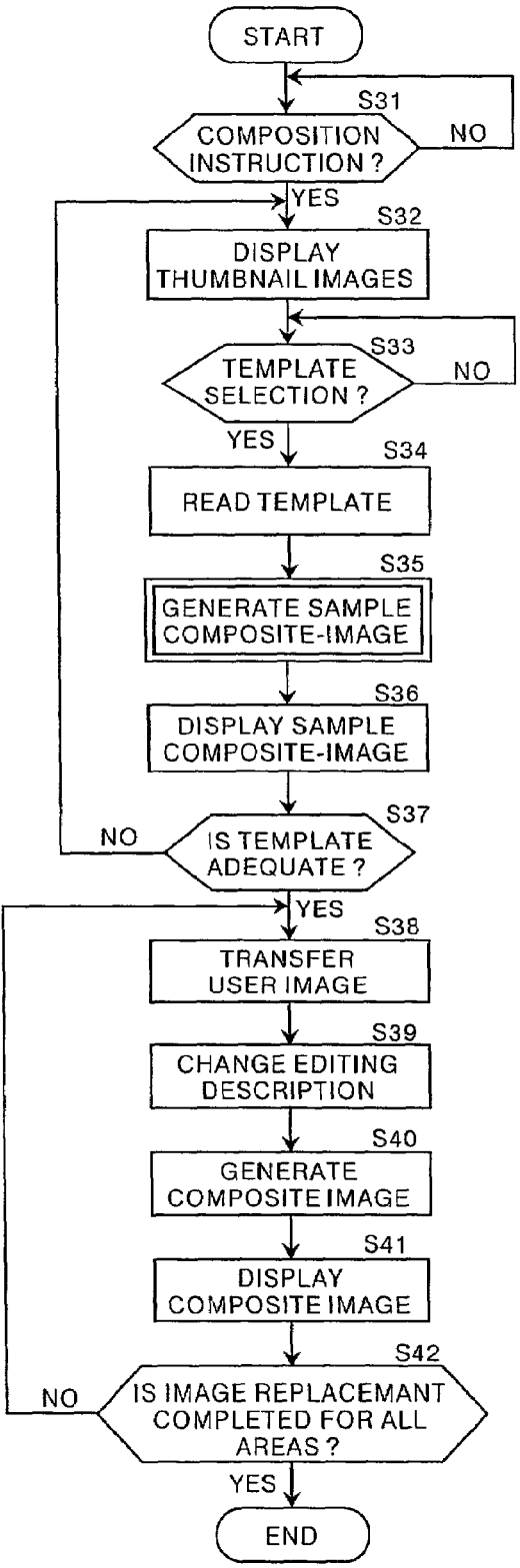
FIG. 25 is a flow chart showing processing carried out in the second embodiment.
Figure 26:
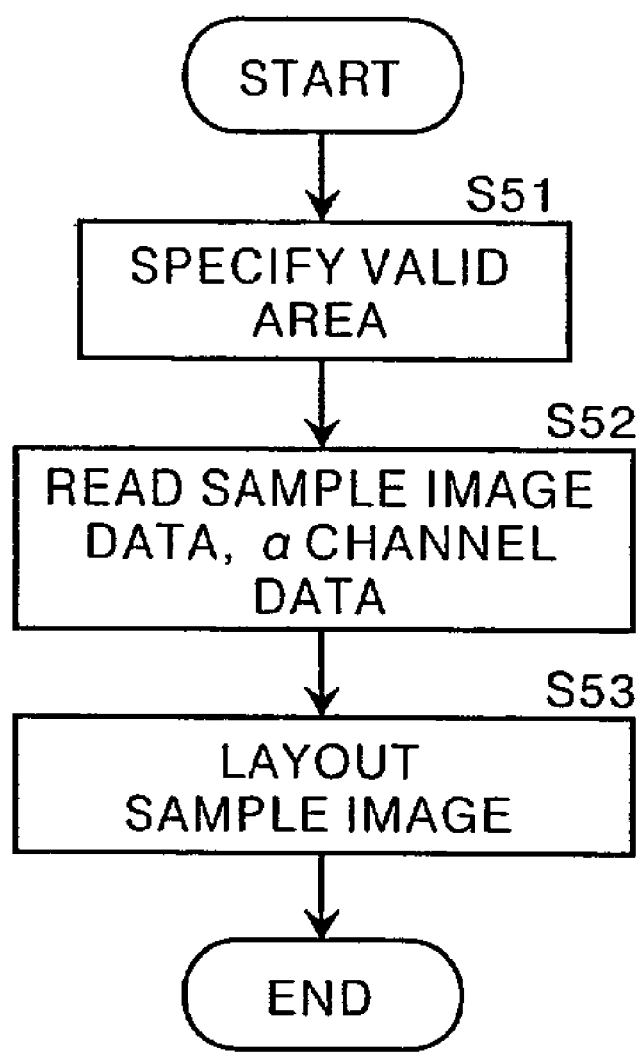
FIG. 26 is a flow chart showing sample composite-image generation processing.

An operation of the second embodiment will be explained next. FIG. 25 is a flow chart showing processing carried out in the second embodiment. In the second embodiment, processing from Step S31 to Step S34 and processing from Step S36 to Step S37 are the same as the processing from Step S1 to Step S4 and from Step S6 to Step S7 of the flow chart of the first embodiment shown in FIG. 10. Therefore, detailed explanation thereof is omitted here. FIG. 26 is a flow chart showing sample composite-image generation processing (Step S35) in the second embodiment. Based on the description of the valid area information in the template T2, the valid area for generating the composite image is specified (Step S51). Based on the descriptions in the image layout commands 1 to 3, the sample image data P5–P7 representing the sample images and the α channel data C5–C7 are read from sample image storing means 4 and α channel storing means 3 (Step S52). The sample image P5 represented by the sample image data P5 (see FIG. 19) and the sample image P6 represented by the sample image data P6 (see FIG. 21) are respectively laid out in the area determined by the α channel data S5 (see FIG. 20) and in the area determined by the α channel data C6 (see FIG. 22) in the valid area, while the sample image P7 represented by the sample image data P7 (see FIG. 23) is laid out in the area determined by the α channel data C7 (see FIG. 24) in the valid area (Step S53).

Figure 27:
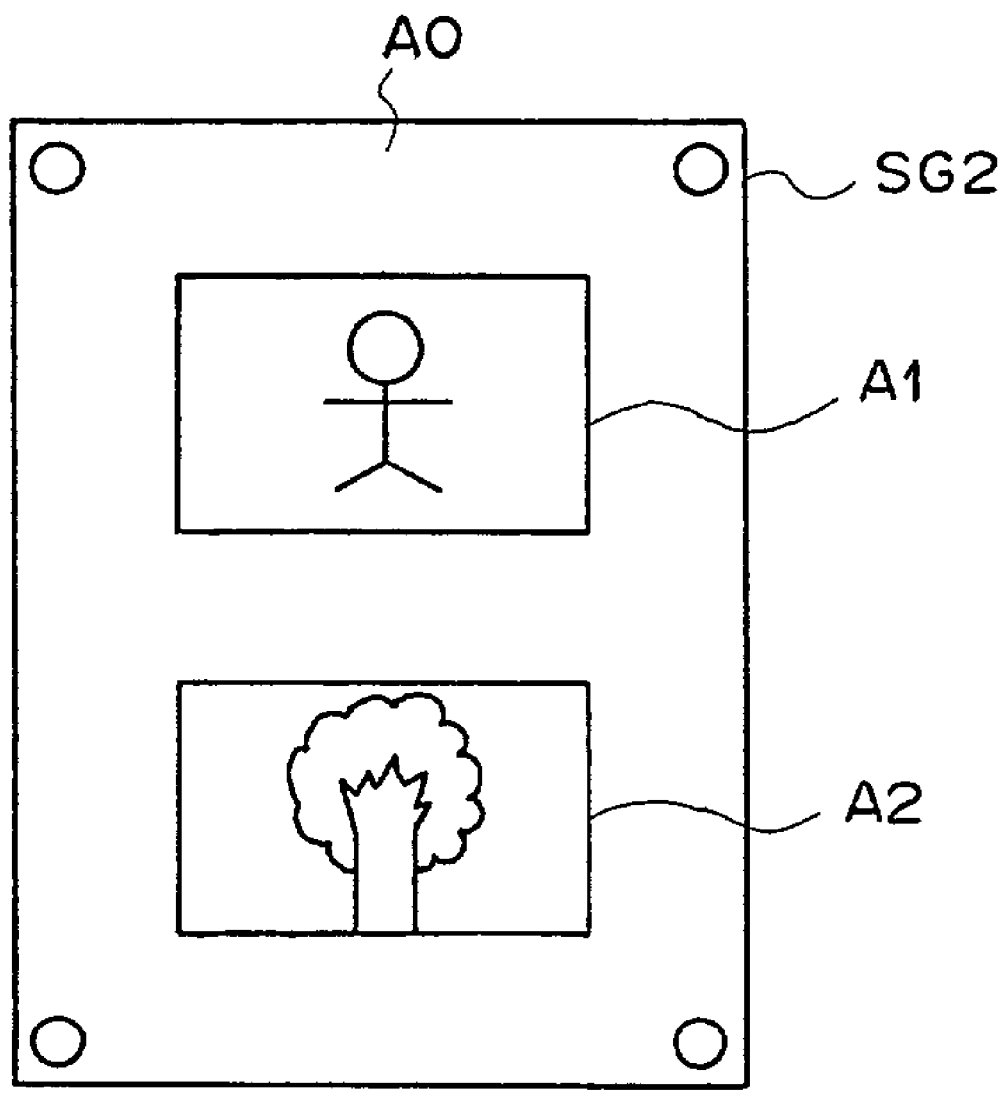
FIG. 27 shows a sample composite image in the second embodiment.

A sample composite image SG2 is generated through the sample composite-image generation processing described above, and sample composite image data SG2 representing the sample composite image shown in FIG. 27 are transferred to a user terminal 10 to be displayed on a monitor 6 (Step S36). The user views the sample composite image displayed on the monitor 6 and confirms whether or not the template T2 is adequate to use. If the template T2 can be used, this judgment is input from input means 7 (step S37) and the procedure advances to subsequent processing. If the user wishes to change the template T2, the user notifies this change from the input means 7. A result at Step S37 becomes negative and the procedure returns to Step S32. The processing from Step S32 to Step S37 is then repeated.

Figure 29:
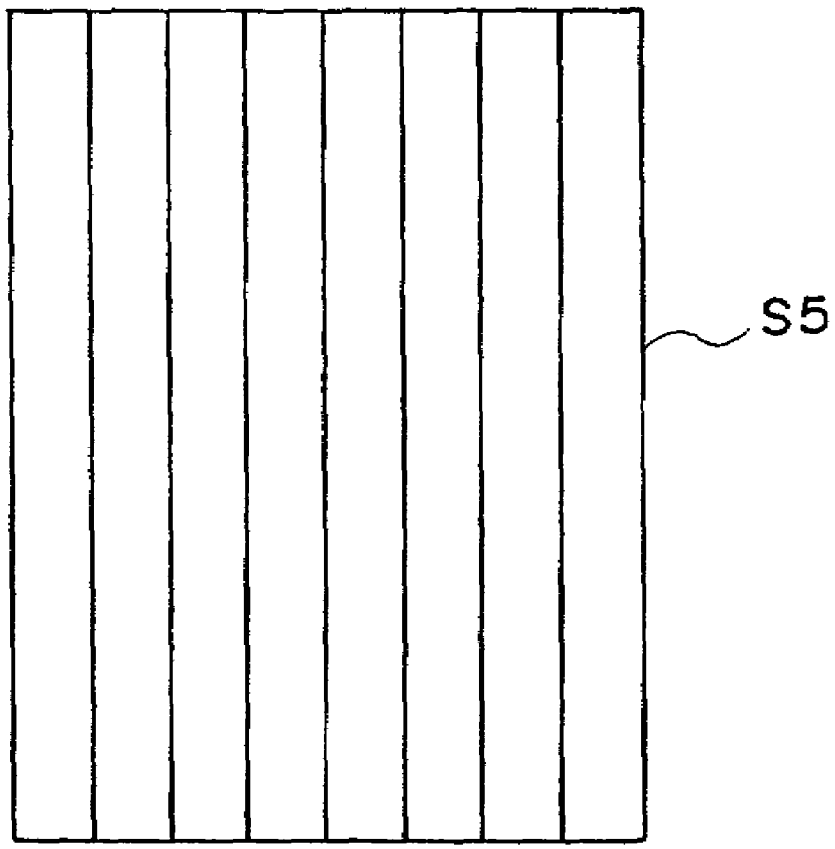
FIG. 29 shows a user image S5 used in the second embodiment.
Figure 30:
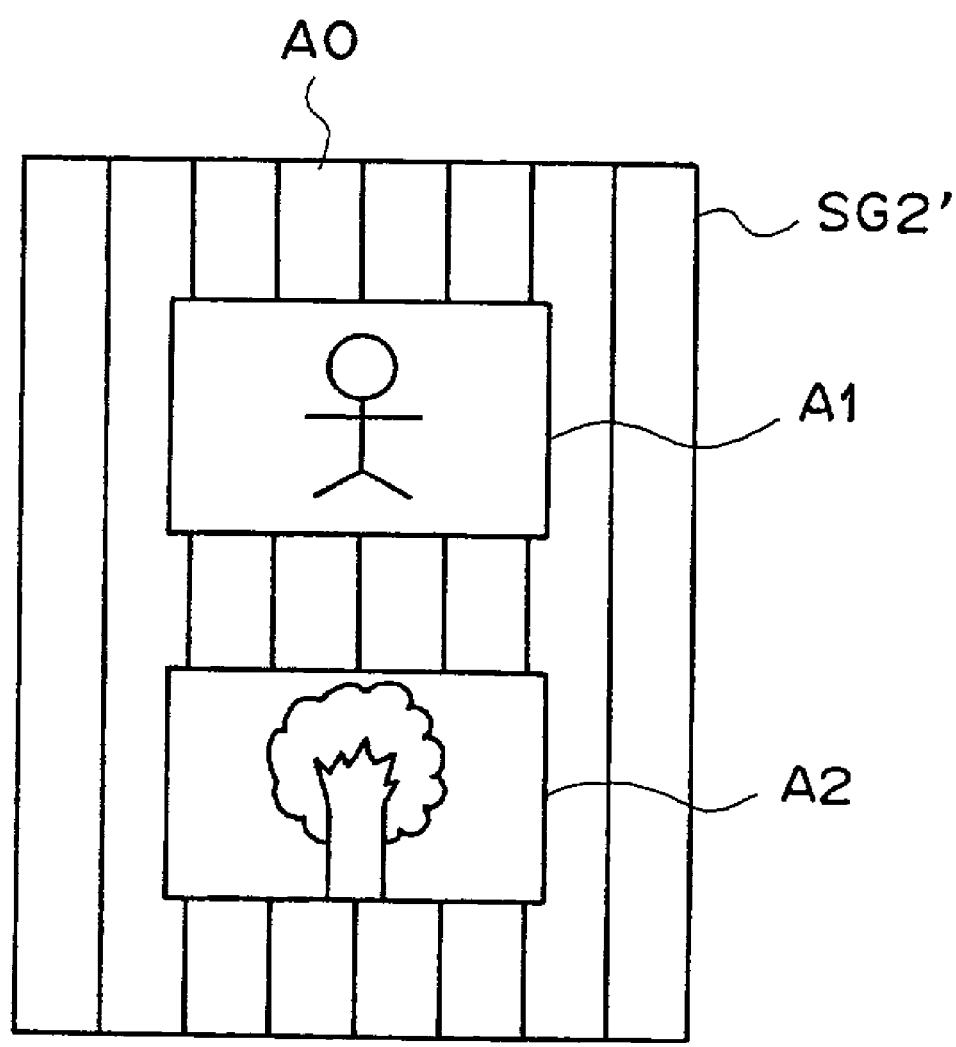
FIG. 30 shows a state in which the user image S5 has been laid out in an area A0.

In the case where the template T2 is adequate, an instruction to prompt the user to specify a user image is transferred from composition means 5 to the user terminal 10. A command prompting the specification of the user image, such as "select user image", is then displayed on the monitor 6, for example. The user selects an area in which the user image is laid out in the sample composite image SG2 displayed on the monitor 6. This selection is carried out by clicking on the area in which the user image is laid out by using a mouse, for example. If an area A0 in a background of the sample composite image SG2 shown in FIG. 27 is selected, the user transfers user image data S5 representing the user image to be laid out in the area A0 (file name "User5.bmp") to a laboratory server 11 (Step S38). At this time, an instruction to change a layout image to "User5.bmp" is also transferred. In the case where the user image data S5 are stored in the laboratory server 11, the user only has to specify the file name of the user image data S5. The composition means 5 receives the user image data S5 and changes the file name of the layout image in the image layout command 1 in the template T2 from "Sample5.bmp" to "User5.bmp" (Step S39). FIG. 28 shows the template T2 after the description change. After the description of the template T2 has been changed in the above manner, a composite image SG2' is generated according to the editing descriptions (Step S40). In the case where the user image represented by the user image data S5 is as shown in FIG. 29, the composite image SG2' obtained by the processing at Step S40 has the user image S5 having replaced the image in the area A0 as shown in FIG. 30. Composite image data representing the composite image SG2' having been generated in the above manner are transferred to the user terminal 10 to be displayed on the monitor 6 (Step S41).

Whether the image replacement has been carried out for all areas is judged (Step S42) and the procedure is completed if a result at Step S42 is affirmative. Meanwhile, if the result at Step S42 is negative, the procedure returns to Step S38 and the processing from Step S38 to Step S42 is repeated. In the second embodiment, since image replacement in areas A1 and A2 has not been carried out, the user again selects the areas to lay out user images in the composite image SG2' displayed on the monitor 6 (Step S38).

If the area A1 on the upper side of the sample composite image SG2' and the area A2 on the lower side thereof are selected one by one, the user transfers user image data S6 and S7 (file names "User6.bmp" and "User7.bmp") representing the user images to be laid out in the areas A1 and A2 to the laboratory server 11 (Step S38). At this time, instructions to change the layout images in the areas A1 and A2 to "User6.bmp" and "User7.bmp" are also transferred. In the case where the user image data S6 and S7 are stored in the laboratory server 11, the user only has to specify the file names of the user image data S6 and S7. The composition means 5 receives the user image data S6 and S7 and changes the file names of the layout images in the image layout commands 2 and 3 of the template T2 from "Sample6.bmp" and "Sample7.bmp" to "User6.bmp" and "User7.bmp" (Step S39). FIG. 31 shows the template T2 having been subjected to the description change. After the descriptions of the template T2 have been changed in the above manner, a composite image G2 is generated according to the editing descriptions (Step S40). If the user images S6 and S7 represented by the user image data S6 and S7 are as shown in FIGS. 32 and 33 respectively, the composite image G2 generated by the processing at Step S40 has the user images S6 and S7 having replaced the images in the areas A1 and A2 as shown in FIG. 34. Composite image data G2 representing the composite image G2 are transferred to the user terminal 10 to be displayed on the monitor 6 (Step S41).

In this manner, the image replacement has been completed for all the areas and the result at Step S42 becomes affirmative. Therefore, the procedure is completed.

As has been described above, in the second embodiment, the composite image G2 is generated based on the template T2 comprising the editing descriptions. Therefore, the images S5–S7 owned by the user can be laid out according to the content of the descriptions in the template T2. As a result, the composite image generated by using the template T2 has improved expressiveness and the user can obtain the composite image G2 having the desired background only by specifying the user images S5–S7.

In the first and second embodiments described above, the file names of the α channel data stored in the α channel storing means 3 are specified in the descriptions of the layout areas in the image layout commands. However, the template T may have the α channel data so that the description portions of the layout areas can specify the α channel data added to the template T. Furthermore, the layout area description portions may specify link information such as a database address storing the α channel data.

In the first or second embodiment, the image to be used as the background of the template is specified in the image layout command 1. However, the image is not necessarily limited to this example. A composite image having been subjected to processing based on an editing description may be specified as the image. In this case, if the composite image is obtained based on a plurality of editing descriptions, an image having been partially subjected to the processing may be specified.

Figure 35:
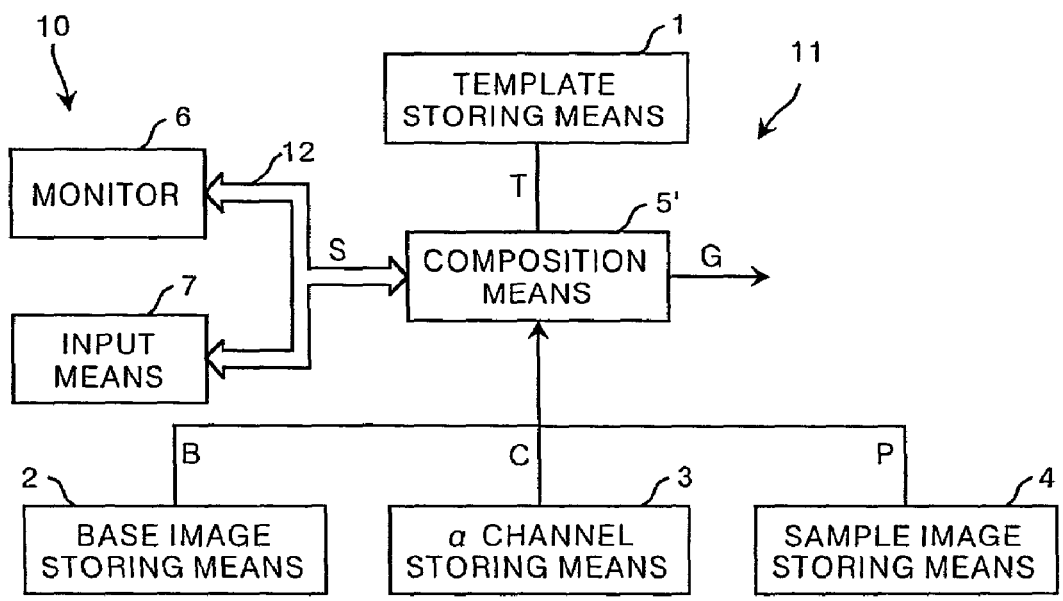
FIG. 35 is a block diagram showing an outline configuration of an image composition system adopting a composite-image generating apparatus as a third embodiment of the present invention.

A third embodiment of the present invention will be explained next. FIG. 35 is a block diagram showing an outline configuration of a system including a composite-image generating apparatus as the third embodiment of the present invention. In FIG. 35, the same components as in FIG. 1 have the same reference numerals and detailed explanation thereof is omitted. As shown in FIG. 35, the image composition system including the composite-image generating apparatus according to the third embodiment comprises base image storing means 2 for storing base image data B representing a base image described in a template T (hereinafter, the base image is also represented by B). In composition means 5, composite image data G representing a composite image comprising an image represented by image data S owned by a user and the base image described in an editing description of the template T are obtained based on editing descriptions of the template T, which is a difference from the first embodiment. The composition means 5 shown in FIG. 35 corresponds to the reception means and the composition means in the second composite-image generating apparatus of the present invention described above.

Template storing mean 1 stores a plurality of sets of template data T as in the first embodiment. A user selects a desired one of templates (called template T3 in the third embodiment) from thumbnail images displayed on a monitor 6 and the composition means 5 generates a composite image from a user image and the selected template T3.

FIG. 36 shows the content of editing descriptions in the template T3 in the third embodiment. As shown in FIG. 36, the editing descriptions in the template T3 comprise a description specifying a base image to be used as a background of the template T3, an image insertion command for specifying an image to be inserted, and image processing commands 1 to 3 specifying the content of image processing to be carried out on the composite image.

Figure 37:
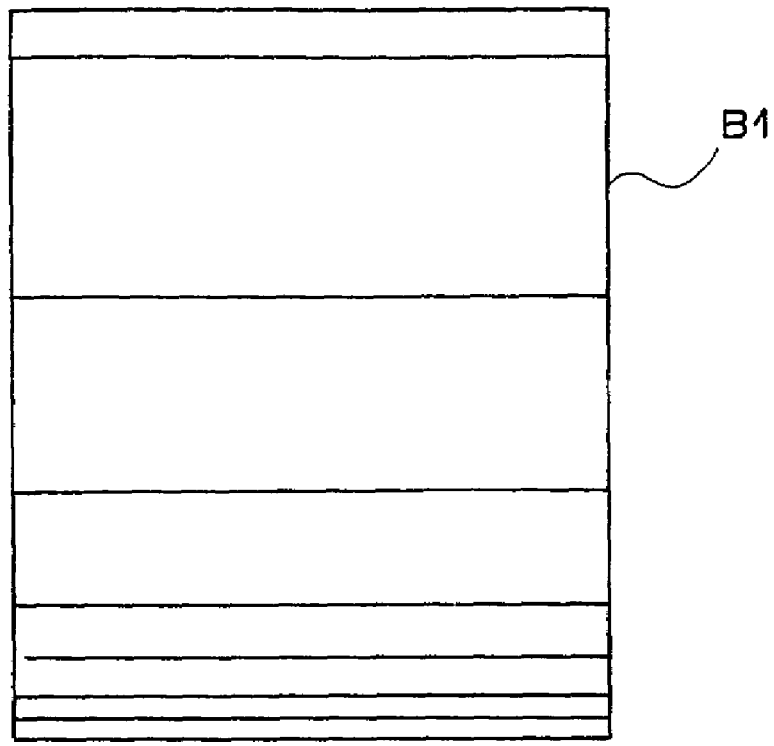
FIG. 37 shows a base image used in the third embodiment.

The description specifying the base image is a file name of base image data B1 representing the base image to become the background of the template T3. In this embodiment, a file name "Base01.bmp" representing an image shown in FIG. 37 is specified. Based on the description of the base image specification, the base image data B1 having this file name are read from the base image storing means 2 and input to the composition means 5. The base image data B1 are the same as the user image data S0 in the first embodiment.

A description of the image insertion command comprises a portion of insertion image specification for specifying an image to be inserted and a portion of an insertion area specification for specifying an area in which the insertion image is inserted. The description portion of the insertion image specifies a file name "Sample1.bmp" of sample image data P1 representing a predetermined sample image shown in FIG. 5 before the user specifies an image to be inserted. Meanwhile, the description portion of the insertion area specifies a file name of α channel data specifying the area for image insertion in the base image. In this embodiment, this description portion specifies a file name "alpha1.bmp" of α channel data C1 causing a value of the hatched area in FIG. 6 to become 1 and causing a value of the other area to become 0.

The descriptions in the image processing commands 1 to 3 are the same as the descriptions in the image processing commands 1 to 3 in the template T1 in the first embodiment.

An operation of the third embodiment will be explained next. In the third embodiment, only processing for sample composite-image generation at Step S5 is different from the processing in the first embodiment shown in FIG. 10. Therefore, the processing at Step S5 will be explained in detail.

Figure 38:
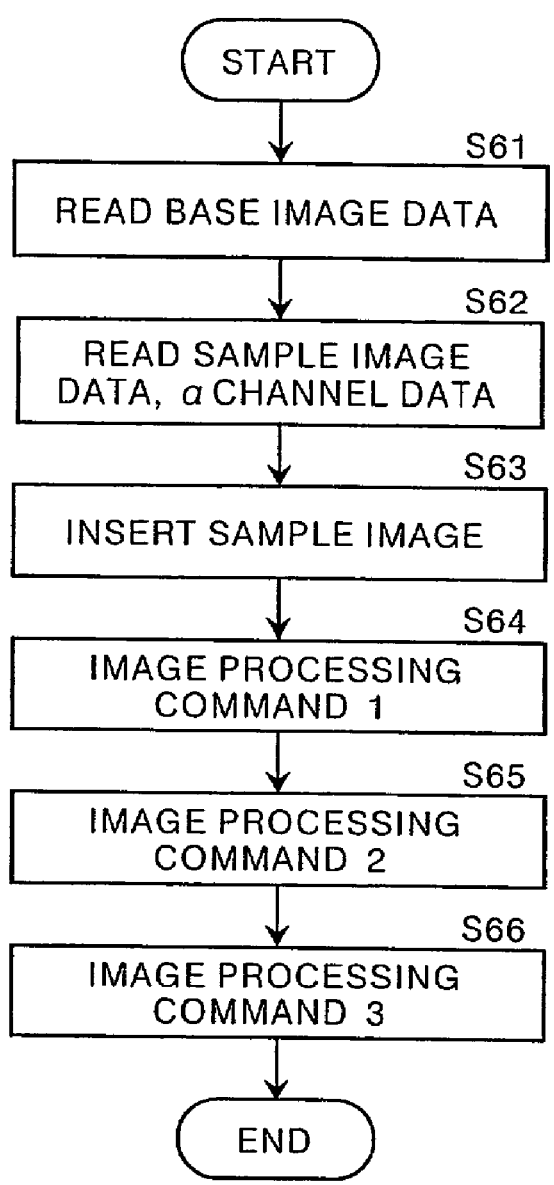
FIG. 38 is a flow chart showing sample composite-image generation processing.

FIG. 38 shows a flow chart of the sample composite-image generation processing in the third embodiment. Based on the description specifying the base image in the template T3, the base image data B1 representing the base image shown in FIG. 37 are read from the base image storing means 2 (Step S61). Based on the description of the image insertion command, the sample image data P1 representing the sample insertion image and the α channel data C1 for specifying the insertion area are read from sample image storing means 4 and α channel storing means 3 (Step S62). The sample image represented by the sample image data P1 (see FIG. 5) is then inserted in the area determined by the α channel data C1 (see FIG. 6) in the base image (Step S63).

The image processing command 1 is then carried out (Step S64). The image processing command 1 is a command to add a white fringe to a surrounding area of the insertion image (see FIG. 7). The image processing command 2 is then carried out (Step S65). The image processing command 2 is a command to form a reflection image of the insertion image having the white fringe in the area shown in FIG. 8. The image processing command 3 is then carried out (Step S66). The image processing command 3 is to form a wavy pattern in the area shown in FIG. 9.

A sample composite image SG3 shown in FIG. 39 is generated through the sample composite-image generation processing described above. Sample composite image data representing the sample composite image SG3 are transferred to a user terminal 10 to be displayed on a monitor 6. If the user confirms the template T3 as the template to be used, the user specifies the user image to be inserted and transfers image data S1 (file name "User1.bmp") representing the user image to the laboratory server 11. The composition means 5 receives the user image data S1 and changes the file name of the insertion image in the template T3 from "Sample1.bmp" to "User1.bmp". FIG. 40 shows the template whose editing description has been changed. After the description of the template T3 has been changed in the above manner, a composite image G3 is then generated according to the editing description having been changed. If the user image represented by the user image data S1 is as shown in FIG. 16, the composite image G3 is the same as the composite image G1 shown in FIG. 17. After the composite image G3 has been generated in the above manner, composite image data G3 representing the composite image are output and the procedure is completed.

As has been described above, in the third embodiment, the composite image G3 is generated according to the template T3 comprising the editing descriptions. Therefore, the user image S1 can be inserted and the image processing can be carried out on the composite image G3 according to the editing descriptions in the template T3. As a result, the composite image generated by using the template T3 has improved expressiveness and the user can obtain the composite image G3 having been subjected to the image processing simply by specifying the user image S1.

A fourth embodiment of the present invention will be explained next. FIG. 41 shows editing descriptions of a template T4 used in the fourth embodiment. As shown in FIG. 41, the editing descriptions of the template T4 comprise a description specifying a base image to be used as a background of the template T4 and two image insertion commands 1 and 2 for specifying images to be inserted. The descriptions do not include an image processing command. In the fourth embodiment, since a configuration of an image composition system is the same as the configuration of the image processing system of the third embodiment shown in FIG. 35, detailed explanation thereof is omitted here.

Figure 42:
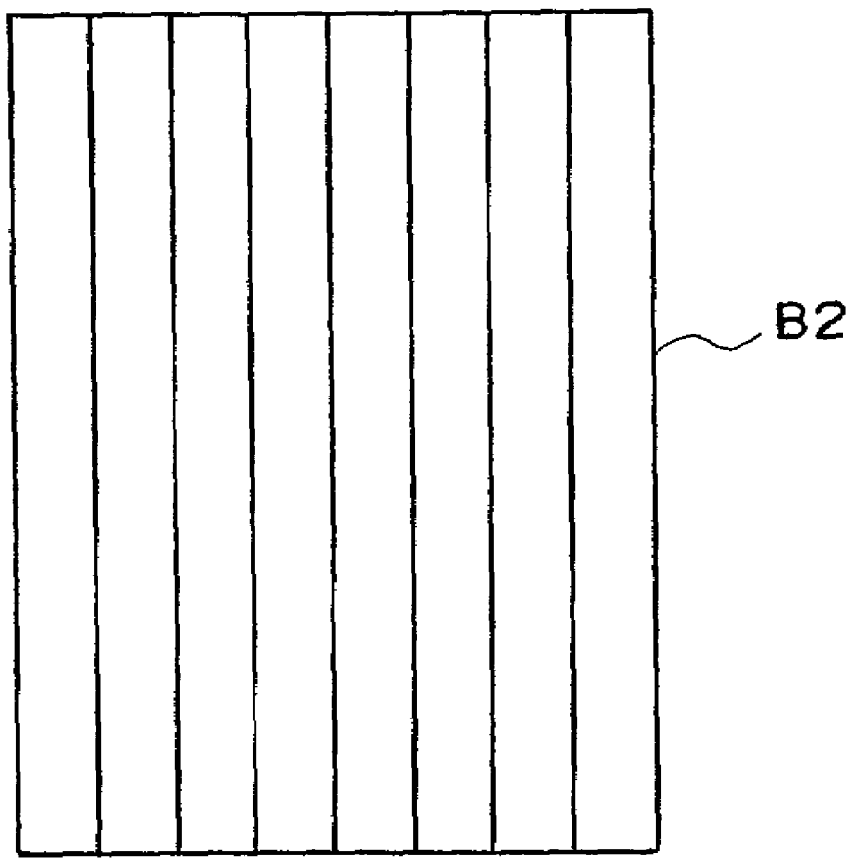
FIG. 42 shows a base image used in the fourth embodiment.

The description for specifying the base image in the template T4 in the fourth embodiment is a file name of base image data B2 representing a base image to become the background of the template T4. In this embodiment, a file name "Base02.bmp" representing an image shown in FIG. 42 is specified. The base image data B2 are the same as the user image data S5 in the second embodiment.

In the image insertion command 1, a file name such as "Sample6.bmp" of sample image data P6 representing a predetermined sample image shown in FIG. 21 is specified in an insertion image description portion before a user specifies a user image. Meanwhile, an insertion area description portion specifies a file name of a channel data specifying an area in which an insertion image is inserted in the base image. In this embodiment, a file name "alpha6.bmp" of α channel data C6 causing a value of a hatched area in FIG. 22 to become 1 and causing a value of the other area to become 0 is specified.

In the image insertion command 2, before the user specifies a user image, an insertion image description portion specifies a file name "Sample7.bmp" of sample image data P7 representing a predetermined sample image shown in FIG. 23, for example. Meanwhile, an insertion area description portion specifies a file name of α channel data specifying an area in which an insertion image is inserted in the base image. In this embodiment, a file name "alpha7.bmp" of α channel data C7 causing a value of a hatched area in FIG. 24 to become 1 and causing a value of the other area to become 0 is specified.

An operation of the fourth embodiment will be explained next. In the operation of the fourth embodiment, only sample composite-image generation processing is different from the sample composite-image generation processing at Step S35 of the second embodiment shown in FIG. 25. Therefore, only the processing at Step S35 will be explained here.

Figure 43:
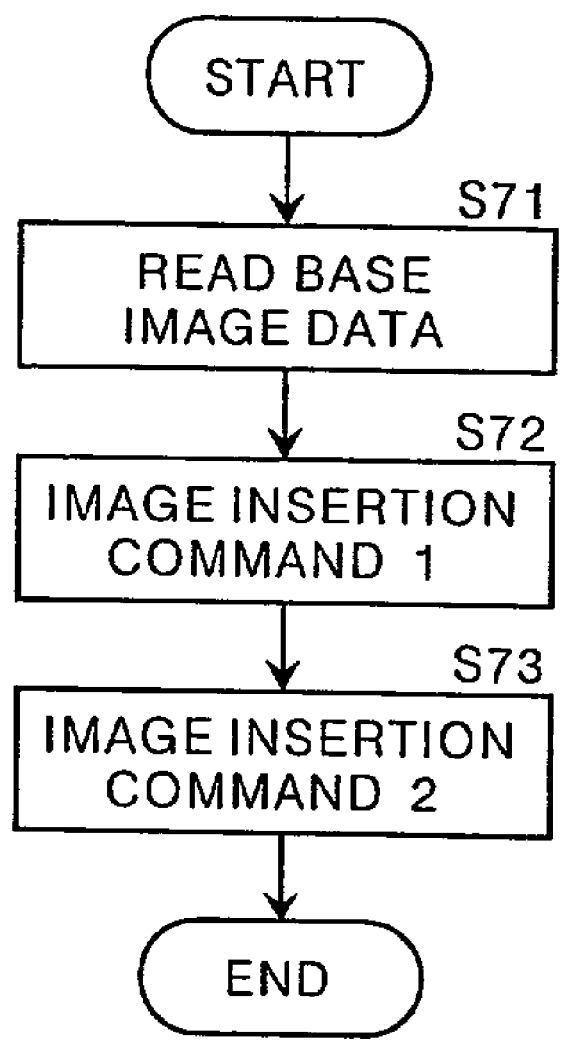
FIG. 43 is a flow chart showing sample composite-image generation processing in the fourth embodiment.

FIG. 43 shows a flow chart of the sample composite-image generation processing in the fourth embodiment. Based on the description specifying the base image in the template T4, the base image data B2 representing the base image shown in FIG. 42 are read from base image storing means 2 (Step S71). Based on the description of the image insertion command 1, the sample image data P6 representing the sample insertion image and the α channel data C6 for specifying the area of insertion are read from sample image storing means 4 and α channel storing means 3, respectively. The sample image represented by the sample image data P6 (see FIG. 21) is inserted in the area determined by the α channel data C6 (see FIG. 22) in the base image (Step S72). According to the description in the image insertion command 2, the sample image data P7 representing the sample insertion image and the α channel data C7 specifying the area of insertion are read from the sample image storing means 4 and the α channel storing means 3, respectively. The sample image represented by the sample image data P7 (see FIG. 23) is inserted in the area determined by the α channel data C7 (see FIG. 24) in the base image (Step S73).

Figure 45:
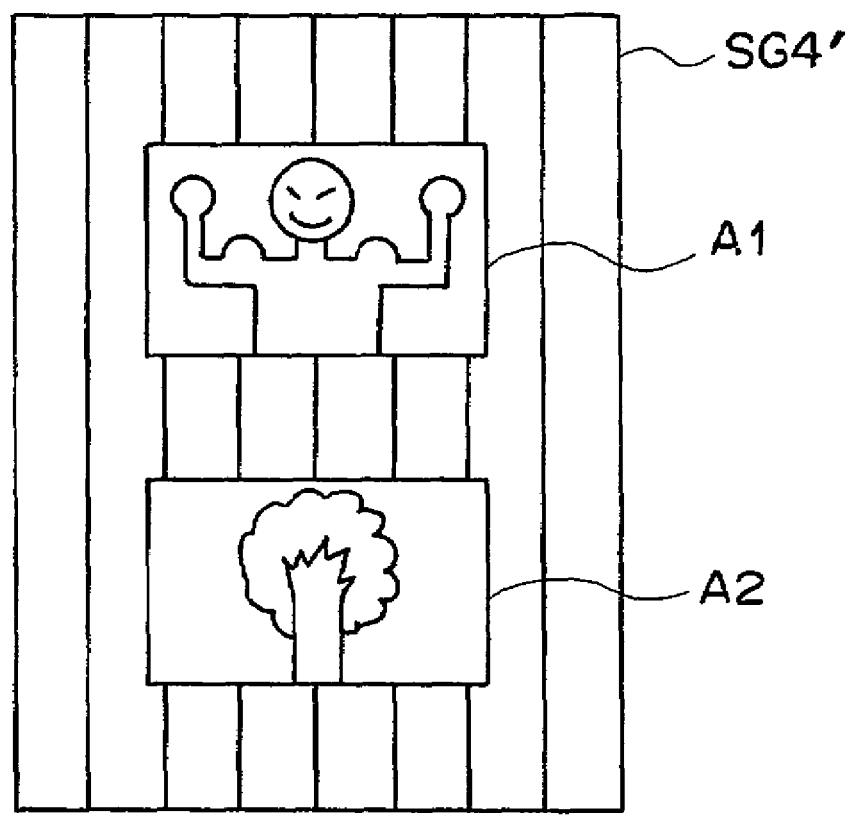
FIG. 45 shows a state in which a user image has been inserted in the area A1.
Figure 47A:
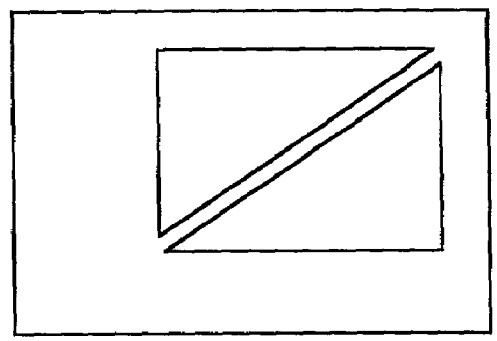
FIGS. 47A and 47B show an example of a conventional template.
Figure 47B:
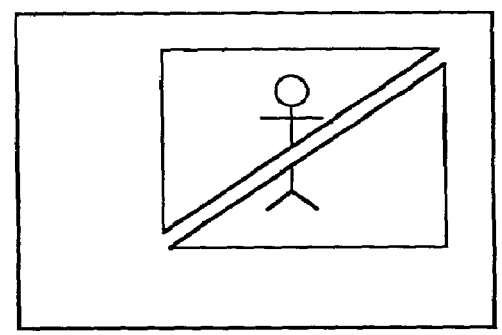

Through this sample composite-image generation generating processing, a sample composite image SG4 is generated. The sample composite image SG4 is the same as the composite image SG2' shown in FIG. 30. Sample composite-image data SG4 representing the sample composite image are then transferred to a user terminal 10 to be displayed on a monitor 6. If the template T4 shown on the monitor 6 is adequate, the user specifies the user image to be inserted and transfers user image data S6 (file name "User6.bmp") representing the user image to a laboratory server 11. Composition means 5 receives the user image data S6 and changes the description of the insertion image file name in the image insertion command 1 from "Sample6.bmp" to "User6.bmp". FIG. 44 shows the template T4 after the description change. After the description of the template T4 has been changed in the above manner, a composite image SG4' is generated based on the description having been changed. If the user image represented by the user image data S6 is as shown in FIG. 32, the composite image SG4' has the user image S6 having replaced the image in the area A1 as shown in FIG. 45. Composite image data SG4' representing the composite image having been generated are transferred to the user terminal 10 to be displayed on the monitor 6.

Whether or not the image replacement has been completed for all areas is then judged. In the case where the replacement has been completed for all the areas, the processing is completed. Meanwhile, if the processing is not completed, the composite-image generation processing described above is repeated. In the fourth embodiment, since the image replacement has not been carried out in the area A2, the user transfers to the laboratory server 11 image data S7 (file name "User7.bmp") representing the user image to be inserted in the area A2 in a lower portion of the composite image SG4'. The composition means 5 receives the user image data S7 and changes the file name of the insertion image from "Sample7.bmp" to "User7.bmp" in the image insertion command 2 in the template T4. FIG. 46 shows the template T4 after the description change. After the description of the template T4 has been changed in the above manner, a composite image G4 is generated based on the changed description. If the user image represented by the user image data S7 is as shown in FIG. 33, the composite image G4 has the user image having replaced the image in the area A2, in addition to the image replacement in the area A1. The composite image G4 is the same as the composite image G2 in FIG. 34.

As has been described above, in the fourth embodiment, the insertion areas are specified in accordance with the number of insertion images when the user images are inserted in the template. Therefore, the images can be inserted in the corresponding insertion areas and none of the insertion images extend over another one of the insertion areas.

In the third embodiment, only one image insertion command is described. However, a plurality of image insertion commands can be described as in the fourth embodiment.

In the third and fourth embodiments above, the file names of the α channel data stored in the α channel storing means 3 are specified in the description portions of the insertion areas in the image insertion commands. However, the α channel data may be added to the templates T so that the description portions of the insertion areas specify the α channel data added to the templates. Alternatively, the description portions of the insertion areas may specify link information such as an address of a database storing the α channel data.

Furthermore, in the third and fourth embodiments, the descriptions specifying the base images refer to the images to become backgrounds of the templates. However, a base image is not limited to this example, and a composite image having been processed according to an editing description may be used as the base image. In this case, if the composite image is obtained based on a plurality of editing descriptions, a composite image partially having been subjected to the processing may be used as the base image.

Moreover, in the second and fourth embodiments, the editing descriptions of the templates T2 and T4 may include image processing commands as in the first and third embodiments.

In the first and third embodiments above, the image processing commands specify the processing to add the white fringe, to generate the reflection image and to cause the image to look wavy. However, the image processing is not limited to these examples and image processing of other kinds can also be specified.

In addition, all of the contents of Japanese Patent Application Nos. 11(1999)-337994 and 11(1999)-337995 are incorporated into this specification by reference.

What is claimed is:

1. A computer-readable recording medium storing template data representing a template, the template comprising:
    an editing description for setting a valid area in a two-dimensional plane; and
    editing descriptions respectively specifying a plurality of layout areas in the valid area and specifying a plurality of layout images to be laid out in the respective layout areas,
    wherein the specification of the plurality of layout areas is a specification of a plurality of alpha channel data files, and
    wherein for each of the plurality of layout areas, a corresponding default image is specified to be laid out according to the corresponding each of the plurality of alpha channel data files for generating an initial composite image.

2. A computer-readable recording medium as defined in claim 1, wherein the template further comprises at least one editing description respectively specifying the content of image processing carried out on any one of the layout images.

3. A computer-readable recording medium storing template data representing a template, the template comprising:
    an editing description for specifying a base image; and
    editing descriptions respectively specifying a plurality of insertion areas in the base image and specifying a plurality of insertion images to be inserted in the respective insertion areas,
    wherein the specification of the plurality of insertion areas is a specification of a plurality of alpha channel data files, and
    wherein for each insertion area, a corresponding default image is specified to be inserted according to the corresponding each of the plurality of alpha channel data files for generating an initial composite image.

4. A computer-readable recording medium as defined in claim 3, wherein the template further comprises at least one editing description respectively specifying the content of image processing to be carried out on the base image and/or any one of the insertion images.

5. A computer-readable recording medium storing template data representing a template, the template comprising:
    an editing description for specifying a base image;
    at least one editing description respectively specifying an insertion area in the base image and specifying an insertion image to be inserted in the insertion area; and
    at least one editing description for specifying the content of image processing to be carried out on the base image and/or the insertion images,
    wherein the specification of the insertion area is a specification of an alpha channel data file, and
    wherein for each of the at least one editing description specifying the insertion area, a corresponding default image is specified to be inserted according to the corresponding at least one alpha channel data file for generating an initial composite image.

6. A method of generating a composite image having a plurality of layout images based on template data representing a template, the template comprising:
    an editing description for setting a valid area in a two-dimensional plane; and
    editing descriptions respectively specifying a plurality of layout areas in the valid area and specifying the plurality of layout images to be laid out in the respective layout areas, wherein the specification of the plurality of layout areas is a specification of a plurality of alpha channel data files, the composite-image generation method comprising the steps of:
    setting the valid area based on the editing description for setting the valid area;
    receiving specification of the layout images based on the editing descriptions specifying the layout images;
    generating an initial composite image by laying out a corresponding default image for each of the plurality of layout areas according to the corresponding each of the plurality of alpha channel data files; and
    laying out the layout images based on the editing descriptions specifying the layout areas.

7. A composite-image generation method as defined in claim 6, the template further comprising at least one editing description respectively specifying the content of image processing to be carried out on any one of the layout images, and the method further comprising the step of carrying out the image processing based on the editing description or descriptions specifying the content of the image processing.

8. A method of generating a composite image having a plurality of insertion images inserted in a base image based on template data representing a template, the template comprising:
    an editing description for specifying the base image; and
    editing descriptions respectively specifying a plurality of insertion areas in the base image and specifying the plurality of insertion images inserted in the respective insertion areas, wherein the specification of the plurality of insertion areas is a specification of a plurality of alpha channel data files, the composite-image generation method comprising the steps of:
    receiving specification of the insertion images based on the editing descriptions specifying the insertion images;
    generating an initial composite image by inserting a corresponding default image for each of the plurality of insertion areas according to the corresponding each of the plurality of alpha channel data files; and
    inserting the insertion images in the respective insertion areas in the base image based on the editing description specifying the base image and based on the editing descriptions specifying the insertion areas.

9. A composite-image generation method as defined in claim 8, the template further comprising at least one editing description respectively specifying the content of image processing to be carried out on the base image and/or any one of the insertion images, and the method further comprising the step of carrying out the image processing based on the at least one editing description specifying the content of the image processing.

10. A method of generating a composite-image having at least one insertion image inserted in a base image based on template data representing a template, the template comprising:

an editing description for specifying the base image;

at least one editing description respectively specifying each one of at least one insertion area in the base image and specifying one of the at least one insertion image to be inserted in the insertion area, wherein the specification of the each one of at least one insertion area is a specification of a corresponding at least one alpha channel data file; and at least one editing description respectively specifying the content of image processing to be carried out on the base image and/or any one of the at least one insertion image, the method comprising the steps of:

receiving specification of the at least one insertion image based on the at least one editing description specifying the insertion image;

inserting the at least one insertion image in the at least one insertion area in the base image based on the editing description specifying the base image and based on the at least one editing description specifying the insertion area;

generating an initial composite image by inserting a corresponding default image for the each one of at least one insertion area according to the corresponding each of the at least one alpha channel data file; and carrying out the image processing based on the at least one editing description specifying the content of the image processing.

11. A composite-image generating apparatus for generating a composite image having a plurality of layout images based on template data representing a template, the template including:

an editing description for setting a valid area in a two-dimensional plane; and editing descriptions respectively specifying a plurality of layout areas in the valid area and specifying the layout images to be laid out in the respective layout areas, wherein the specification of the plurality of layout areas is a specification of a plurality of alpha channel data files, the composite-image generating apparatus comprising:

setting means for setting the valid area based on the editing description for setting the valid area;

reception means for receiving specification of the layout images based on the editing descriptions specifying the layout images; and composition means for generating the composite image by laying out the layout images based on the editing descriptions specifying the layout areas and for generating an initial composite image by laying out a corresponding default image for each of the plurality of layout areas according to the corresponding each of the plurality of alpha channel data files.

12. A composite-image generating apparatus as defined in claim 11, the template further including at least one editing description respectively specifying the content of image processing to be carried out on any one of the layout images, and the composition means obtaining the composite image further by carrying out the image processing based on the at least one editing description specifying the content of the image processing.

13. A composite-image generating apparatus for generating a composite image having a plurality of insertion images inserted in a base image based on template data representing a template, the template including:

an editing description for specifying the base image; and editing descriptions respectively specifying a plurality of insertion areas in the base image and specifying the plurality of insertion images to be inserted in the respective insertion areas, wherein the specification of the plurality of insertion areas is a specification of a plurality of alpha channel data files, the composite-image generating apparatus comprising:

reception means for receiving specification of the insertion images based on the editing descriptions specifying the insertion images; and composition means for generating the composite image by inserting the insertion images in the insertion areas in the base image based on the editing description specifying the base image and based on the editing descriptions specifying the insertion areas and for generating an initial composite image by inserting a corresponding default image for each of the plurality of insertion areas according to the corresponding each of the plurality of alpha channel data files.

14. A composite-image generating apparatus as defined in claim 13, the template further including at least one editing description respectively specifying the content of image processing to be carried out on the base image and/or any one of the insertion images, and the composition means obtaining the composite image further by carrying out the image processing based on the at least one editing description specifying the content of the image processing.

15. A composite-image generating apparatus for generating a composite image having at least one insertion image inserted in a base image based on template data representing a template, the template including:

an editing description for specifying the base image;

at least one editing description respectively specifying each one of at least one insertion area in the base image and specifying one of the at least one insertion image to be inserted in the insertion area, wherein the specification of the each one of at least one insertion area is a specification of corresponding at least one alpha channel data file; and at least one editing description respectively specifying the content of image processing to be carried out on the base image and/or any one of the at least one insertion image, the composite-image generating apparatus comprising:

reception means for receiving specification of the at least one insertion image based on the at least one editing description specifying the insertion image; and composition means for inserting the at least one insertion image in the at least one insertion area in the base image based on the editing description specifying the base image and based on the at least one editing description specifying the insertion area and for obtaining the composite image by carrying out the image processing based on the at least one editing description specifying the content of the image processing and for generating an initial composite image by inserting a corresponding default image for the each of the at least one insertion area according to the corresponding each of the at least one alpha channel data file.

16. A computer-readable recording medium storing a program to cause a computer to execute a method of generating a composite image having a plurality of layout images based on template data representing a template, the template comprising;

an editing description for setting a valid area in a two-dimensional plane; and editing descriptions respectively specifying a plurality of layout areas in the valid area and specifying the plurality of layout images laid out in the respective layout areas, wherein the specification of the plurality of layout areas is a specification of a plurality of alpha channel data files, the program comprising the procedures of:

setting the valid area based on the editing description for setting the valid area; receiving specification of the layout images based on the editing descriptions specifying the layout images;

inserting the layout images based on the editing descriptions specifying the layout areas; and generating an initial composite image by inserting a corresponding default image for each of the plurality of layout areas according to the corresponding each of the plurality of alpha channel data files.

17. A computer-readable recording medium as defined in claim 16, the template further comprising at least one editing description respectively specifying the content of image processing to be carried out on any one of the layout images, and the program further comprising the procedure of carrying out the image processing based on the at least one editing description specifying the content of the image processing.

18. A computer-readable recording medium storing a program to cause a computer to execute a method of generating a composite image having a plurality of insertion images inserted in a base image based on template data representing a template, the template comprising:

an editing description for specifying the base image; and editing descriptions respectively specifying a plurality of insertion areas in the base image and specifying the plurality of insertion images inserted in the respective insertion areas, wherein the specification of the plurality of insertion areas is a specification of a plurality of alpha channel data files, the program comprising the procedures of:

receiving specification of the insertion images based on the editing descriptions specifying the insertion images;

inserting the insertion images in the respective insertion areas in the base image based on the editing description specifying the base image and based on the editing descriptions specifying the insertion areas; and generating an initial composite image by inserting a corresponding default image for each of the plurality of insertion areas according to the corresponding each of the plurality of alpha channel data files.

19. A computer-readable recording medium as defined in claim 18, the template further comprising at least one editing description respectively specifying the content of image processing to be carried out on the base image and/or any one of the insertion images, and the program further comprising the procedure of carrying out the image processing based on the at least one editing description specifying the content of the image processing.

20. A computer-readable recording medium storing a program to cause a computer to execute a method of generating a composite-image having at least one insertion image inserted in a base image based on template data representing a template, the template comprising:

an editing description for specifying the base image;

at least one editing description respectively specifying each one of at least one insertion area in the base image and specifying one of the at least one insertion image inserted in the insertion area, wherein the specification of the each one of at least one insertion area is a specification of corresponding at least one alpha channel data file; and at least one editing description respectively specifying the content of image processing to be carried out on the base image and/or any one of the at least one insertion image, the program comprising the procedures of:

receiving specification of the at least one insertion image based on the at least one editing description specifying the insertion image;

generating an initial composite image by inserting a corresponding default image for the each of the at least one insertion area according to the corresponding each of the at least one alpha channel data file;

inserting the at least one insertion image in the at least one insertion area in the base image based on the editing description specifying the base image and based on the at least one editing description specifying the insertion area; and obtaining the composite image by carrying out the image processing based on the at least one editing description specifying the content of the image processing.

21. A method of generating a composite image, comprising:

reading a template, wherein the template includes an editing description comprising a specification for a valid area, a specification of one or more layout areas in the valid area, and a specification of one or more default images to be laid out corresponding to the one or more layout areas, wherein the specification of the one ore more layout areas is a specification of corresponding one or more alpha channel data files;

generating an initial composite image by laying out a corresponding default image for each of the one or more layout areas according to the corresponding one or more alpha channel data files; and generating the composite image by replacing one or more default images of the initial composite image with externally specified images.

22. The method of generating the composite image of claim 21, wherein the externally specified images are images specified by a user.

23. The method of generating the composite image of claim 21, wherein the step of generating initial composite image further comprises:

reading the one or more alpha channel data files.

24. The method of generating the composite image of claim 21, wherein the template further includes a specification of one or more image processing commands, the method further comprising:

processing the one or more image processing commands.

25. A method of generating a composite image, comprising:

reading a template, wherein the template includes an editing description comprising a specification for a base image, a specification for one or more insertion areas in the base image, and a specification of one or more default images to be inserted corresponding to the one or more insertion areas;

generating an initial composite image by inserting a corresponding default image for each of the one or more insertion areas according to the corresponding one or more alpha channel data files; and generating the composite image by replacing one or more default images of the initial composite image with externally supplied images.

26. The method of generating the composite image of claim 25, wherein the externally specified images are images specified by a user.

27. The method of generating the composite image of claim 25, wherein the step of generating initial composite image further comprises:
reading the one or more alpha channel data files.

28. The method of generating the composite image of claim 25, wherein the template further includes a specification of one or more image processing commands, the method further comprising:
processing the one or more image processing commands.

* * * * *